(12) United States Patent
Winiasz et al.

(10) Patent No.: US 8,821,331 B2
(45) Date of Patent: Sep. 2, 2014

(54) SPEED/TORQUE ENHANCING POWER TRANSMISSION

(75) Inventors: Michael E. Winiasz, Lorain, OH (US); Kurt R. Lauer, Oberlin, OH (US)

(73) Assignee: ADI Wind, LLC, Sheffield Village, OH (US)

( * ) Notice: Subject to any disclaimer, the term of this patent is extended or adjusted under 35 U.S.C. 154(b) by 295 days.

(21) Appl. No.: 13/499,407

(22) PCT Filed: Oct. 1, 2010

(86) PCT No.: PCT/US2010/051046
§ 371 (c)(1),
(2), (4) Date: Mar. 30, 2012

(87) PCT Pub. No.: WO2012/044321
PCT Pub. Date: Apr. 5, 2012

(65) Prior Publication Data
US 2012/0258834 A1    Oct. 11, 2012

Related U.S. Application Data

(63) Continuation-in-part of application No. 12/572,672, filed on Oct. 2, 2009, now abandoned.

(60) Provisional application No. 61/103,424, filed on Oct. 7, 2008.

(51) Int. Cl.
| | |
|---|---|
| *F16H 57/04* | (2010.01) |
| *F16H 1/32* | (2006.01) |
| *F03D 11/02* | (2006.01) |
| *H02K 7/18* | (2006.01) |
| *H02K 7/116* | (2006.01) |

(52) U.S. Cl.
CPC .............. *F16H 1/32* (2013.01); *Y02E 10/722* (2013.01); *F03D 11/02* (2013.01); *H02K 7/1838* (2013.01); *F05B 2260/40311* (2013.01); *F16H 2001/326* (2013.01); *Y02E 10/725* (2013.01); *F16H 57/0486* (2013.01); *H02K 7/116* (2013.01); *F05B 2260/4031* (2013.01)
USPC ........................................... 475/159; 475/162

(58) Field of Classification Search
USPC ........................................... 475/159, 162, 165
See application file for complete search history.

(56) References Cited

U.S. PATENT DOCUMENTS

| | | |
|---|---|---|
| 3,746,372 A | 7/1973 | Hynes et al. |
| 4,177,695 A | 12/1979 | Grove |

(Continued)

OTHER PUBLICATIONS

International Search Report dated Dec. 2, 2010.

*Primary Examiner* — Edwin A Young
(74) *Attorney, Agent, or Firm* — Richard M. Klein; Fay Sharpe LLP

(57) ABSTRACT

A speed/torque enhancing power transmission is disclosed that translates slow rotating, high torque motion to high rotation, low torque motion or alternatively high rotating low torque motion to low rotating high torque motion and is suitable as a speed increaser for use in a device like a wind turbine. As a speed increaser the transmission has certain advantages, such as reduced weight and/or size compared to other units having the same performance characteristics. The speed increaser employs a pair of externally toothed spur gears orbiting in a non-rotating manner 180° out of phase inside an internally toothed ring gear. The input drives the ring gear and the orbiting spur gears drive separate eccentrics on the output shaft extending in opposite directions to provide dual output. In one embodiment, cross guide projections on the spur gear and cross guide projections on the housing engage slots in a swash plate.

19 Claims, 30 Drawing Sheets

SECTION A-A

(56) References Cited

U.S. PATENT DOCUMENTS

| | | | |
|---|---|---|---|
| 4,183,267 A | 1/1980 | Jackson | |
| 4,228,698 A * | 10/1980 | Winiasz | 475/178 |
| 5,324,240 A * | 6/1994 | Guttinger | 475/162 |
| 6,856,042 B1 | 2/2005 | Kubota | |
| 2004/0248688 A1 * | 12/2004 | Shimada | 475/159 |
| 2008/0261743 A1 | 10/2008 | Junkers | |
| 2010/0084872 A1 | 4/2010 | Winiasz | |

* cited by examiner

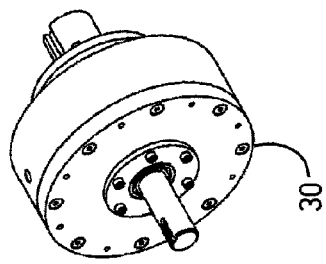
Fig. 1A
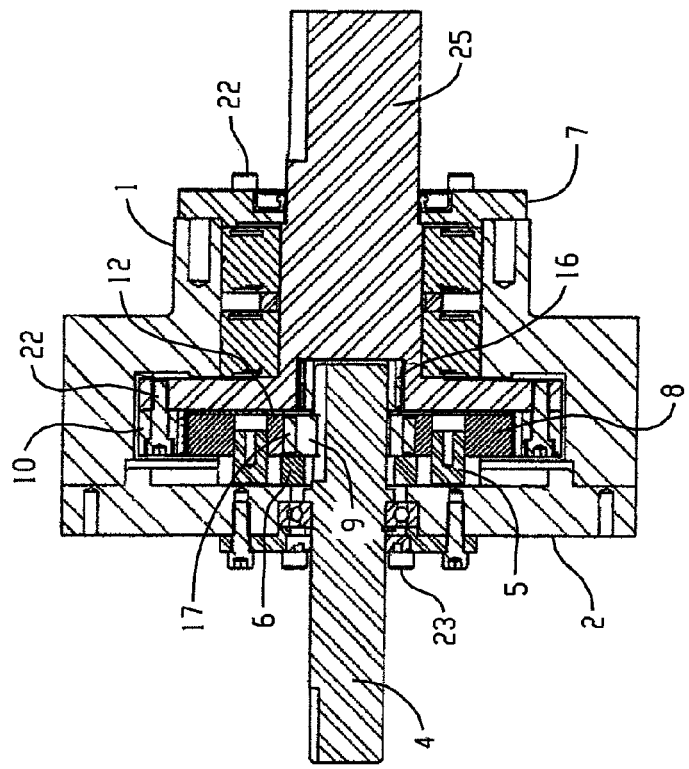
Fig. 1C  SECTION A-A
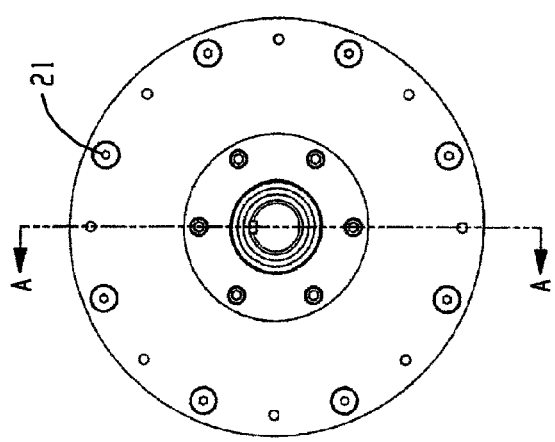
Fig. 1B

SECTION A-A

SPEED/TORQUE ENHANCING POWER TRANSMISSION

This application claims priority to PCT Application No. PCT/US2010/051046, filed Oct. 1, 2010, and is also a Continuation-in-Part of U.S. Utility application Ser. No. 12/572,672, filed Oct. 2, 2009, by Michael E. Winiasz, which claims priority to U.S. Provisional Patent Application Ser. No. 61/103,424, filed Oct. 7, 2008.

BACKGROUND

The present disclosure relates to a speed/torque increaser or enhancer that is suitable for use on motors and/or turbines, such as a wind turbine, for converting slow rotating, high torque motion into high rotation, low torque motion. The present disclosure can also be described as a planocentric gearbox.

Presently, gear boxes for wind turbine applications are complex multi-stage gearing arrangements which are not only bulky and heavy but quite difficult to service when installed on the wind turbine tower. For example, a presently available 600 kilowatt commercially available wind turbine gear box weighs about 8,600 pounds or approximately 77 watts per pound.

It has thus been desired to provide a way or means of reducing the complexity, size and weight of a gear box for substantially increasing the speed/torque of an output shaft and particularly for wind turbine generator applications.

BRIEF DESCRIPTION

Disclosed in embodiments are gearboxes that provide large increases in shaft rotational speed or alternatively torque in an efficient manner. A gearing arrangement is provided in a housing and is capable of being mounted to a source of input power, such as a motor, turbine, or other prime mover. Such speed/torque increasers are useful for enabling large increases in shaft rotational speed in a small volume of space or alternatively torque when employed as a speed reducer and which can be useful as a speed increaser in machines such as wind turbines. The transmission employed as a speed increaser disclosed achieves a mass power density of 250 Watts per pound (550 watts per kilogram) and a volume power density of 23 watts per cubic centimeter.

In some embodiments, the transmission, employed as a speed increaser comprises a housing, an input shaft, an internal spur gear, an external spur gear, a top plate, a cross plate, an eccentric ring, and an output shaft. The housing has a first end and a second end. The rotatable input shaft extends through the first end and including a plate mounted on one end. The internal spur gear is mounted on the plate. An external spur gear engages the internal spur gear and has a first pair of cross guide pins projecting therefrom towards the second end of the housing. The top plate is located at the second end of the housing and has a second pair of cross guide pins projecting therefrom towards the first end of the housing. The cross plate is located between the top plate and the external spur gear and has a first pair of slots adapted to receive the first pair of cross guide pins and a second pair of slots adapted to receive the second pair of cross guide pins, both pairs of pins being movable within the slots. The eccentric ring is mounted along the rotational axis of the external spur gear. The rotatable output shaft extends through the top plate and the cross plate, and engages the eccentric ring.

In other embodiments, the speed increaser comprises a geared bearing, an inner gear, an output shaft, a swash plate, and a back plate. The geared bearing contains teeth on an internal face and can be attached to a hub plate. The inner gear contains teeth on an external face and is positioned to contact the teeth of the geared bearing. The inner gear has a bore and a first pair of drive dogs attached to a front face. The output shaft is positioned within the inner gear bore and is coaxial with the geared bearing. The swash plate contains a first pair of slots and a second pair of slots. The back plate has a second pair of drive dogs attached to a rear face. The first pair of drive dogs mates with the first pair of slots and the second pair of drive dogs mates with the second pair of slots.

In another embodiment or version of the disclosure, a speed increaser has an input member or shaft attached to an internally toothed ring gear which is journalled for rotation on a housing having an output shaft journalled for rotation thereon. The output shaft has an eccentric upon which is journalled an externally toothed spur gear having the pitch diameter of the teeth slightly less than the pitch diameter of the ring gear teeth with the spur gear contacting the teeth of the ring gear in orbiting non-rotating contact. The housing has a first pair of slots formed therein; and, the spur gear has a second pair of slots formed therein. A swash plate has a first pair of cross guide projections in the form of dogs or lugs on one side thereof and a second pair of cross guide projections in the form of dogs or lugs on the opposite or face thereof with the first set of dogs engaging the first set of slots in the housing and the second set of dogs engaging the second set of slots in the spur gear.

In yet another embodiment or version, the swash plate has hardened removable plates provided on the first and second set of dogs and on the surface of the swash plate for providing ready replacement of the sliding surfaces.

In another version or embodiment, the swash plate dogs are cross drilled for communicating with grooves in wear plates mounted on the dogs for providing lubricant galleries to feed lubricant to recesses formed in the wear plates. A lubricant supply port provided in the housing communicates with cross ports for supplying lubricant to the wear plates.

In another version or embodiment, the speed increaser has a generator stator and rotor mounted within the speed increaser housing with the stator mounted on the housing and generator rotor attached to the output shaft and thus the generator is positioned within the housing for the speed increaser. In another version, the input shaft or member has the hub of a fluid turbine impeller attached thereto and the hub extends over the housing of the speed increaser and generator forming an integral assembly.

In another version, the output shaft extends to have an end journalled within the impeller hub; and, the shaft may be a hollow tubular member for permitting power leads to pass through the shaft to the impeller hub for installations where the impeller hub is of the type containing servo motors for varying the pitch of the impeller blades.

In another version of the transmission employed as speed increaser, multiple output shafts are operated by a common orbiting spur gear and are disposed about the face of the housing.

In another aversion, the shafting has a pair of diametrally opposed, or 180° out-of-phase eccentric surfaces upon each of which is mounted a separate spur gear for rotation with respect thereto. The two out-of-phase spur gears are constrained from rotation with respect the gearbox housing but orbit non-rotatably in engagement with a ring gear rotatably journalled on the housing. The orbital movement of the spur gears out-of-phase provides inherent dynamic balancing of the inertial forces of the orbiting spur gears. Power inputted to the ring gear, such as by a wind turbine impeller hub provides a large speed increase to the shafting, which may have a power generator coupled to each opposite end. In one version, the shafting is a one-piece member with both eccentrics thereon. In another version or embodiment, the eccentrics for the spur gears are each on a separate half shaft. Alternatively, if the power is inputted to the shafting on either version the transmission operates as a speed reducer; however, torque multiplication is provided to the ring gear for increased torque output. A swash plate provides wear surfaces for sliding contact of the spur gears in one direction normal to the axis of rotation; and, the swash plate has wear surfaces for sliding on the casing rods in a direction at right angles to the one direction for enabling the orbital non-rotating movement of the spur gears.

The speed/torque increaser of the present disclosure thus provides a mechanism for driving in some versions a generator and a pair of generators in other versions such as employed in a wind turbine generator and which is relatively small, lightweight and having simplified construction.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 1 is a side view of a first exemplary embodiment of a speed increaser of the present disclosure.

DETAILED DESCRIPTION

Figure 2:
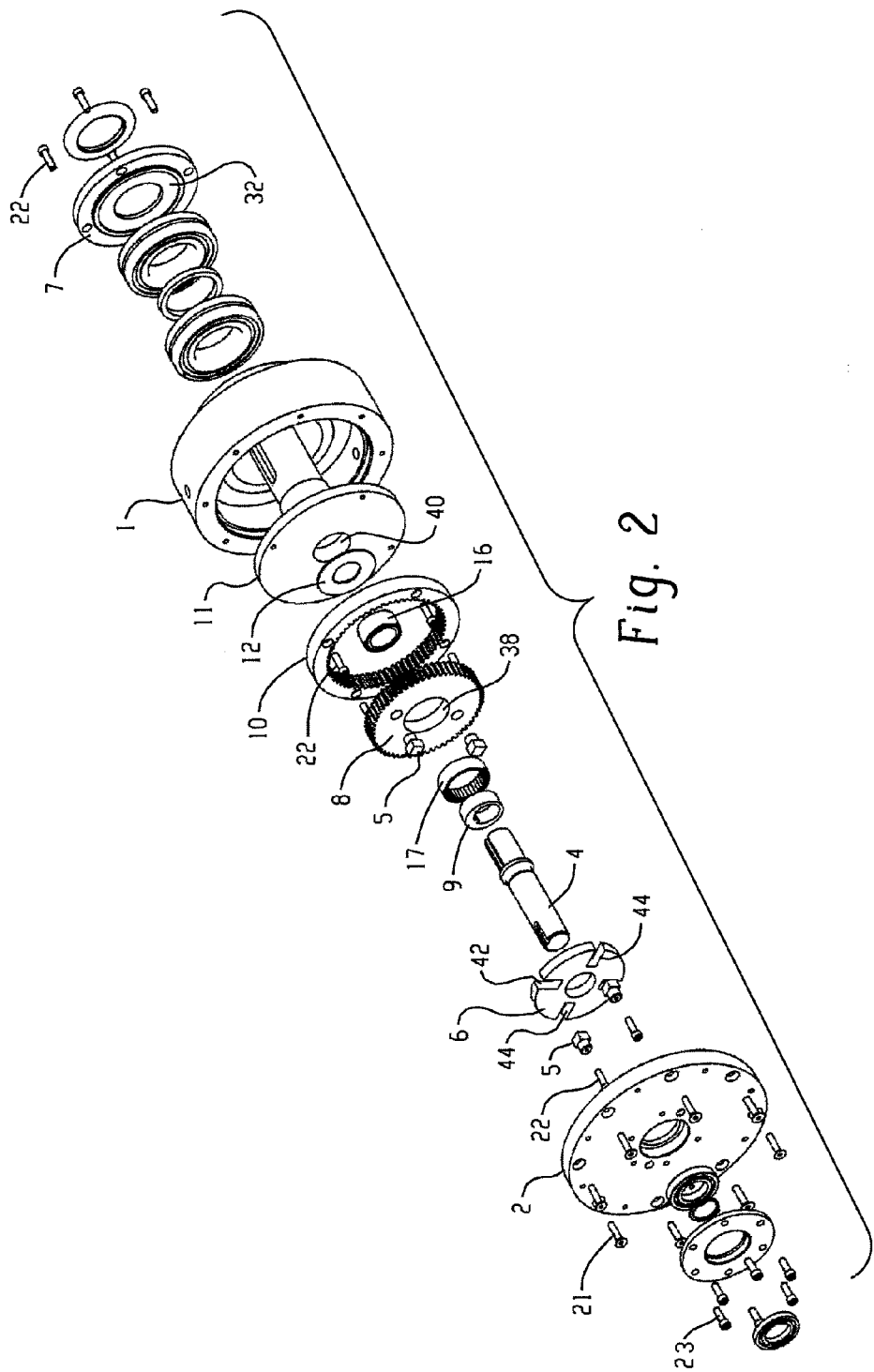
FIG. 2 is an exploded perspective view of the first exemplary embodiment a speed increaser of the present disclosure.
Figure 3A:
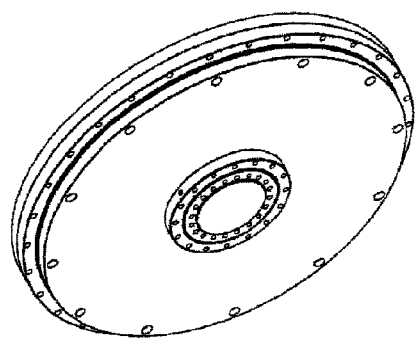
FIG. 3 is a series of different views of a second exemplary embodiment of a speed increaser of the present disclosure.
Figure 3D:
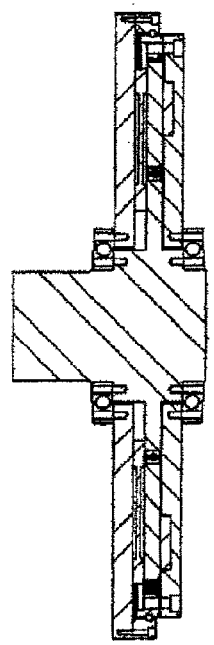
Figure 3C:
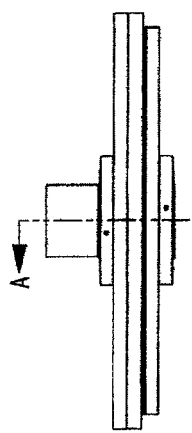
Figure 3B:
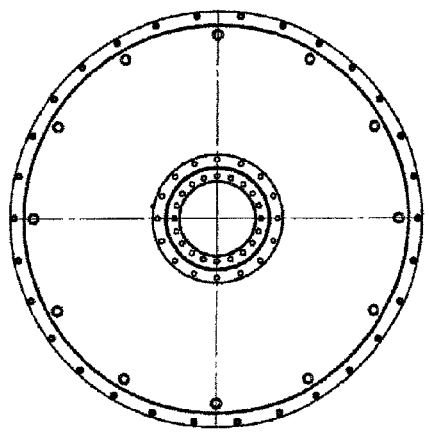

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Shown in FIGS. 1 and 2 is an exemplary embodiment of a speed increaser of the present disclosure. The speed increaser's input source and prime mover, such as an electric motor, a hydraulic motor, or a wind turbine is capable of being mounted to a hub plate 11. The hub plate may be attached to an input shaft 25, as seen in FIG. 1, if desired. The gearing arrangement is contained in a housing assembly 30 comprising a housing member or gearbox housing 1. The input shaft 25 enters the housing member 1 through a central opening 32 in a seal plate 7. The output shaft 4 enters the housing member 1 through a central opening 34 in a top plate 2. The seal plate and top plate are attached to the housing member 1 by fasteners such as screws 21, 23.

An internal spur gear 10 is mounted to the hub plate 11. As the hub plate 11 rotates, the internal spur gear 10 is rotated.

An external spur gear 8 engages the internal spur gear 10. One or more bearings 16 may be inserted to separate the external spur gear 8 from the hub plate 11. The external spur gear 8 may include a bore 38 in its center (i.e. along the rotational axis). As shown here, a bearing 17 is located within this bore. An eccentric ring 9 is located within the bearing 17 and an output shaft 4 engages the eccentric ring 9. In some embodiments, the output shaft 4 extends into a bore 40 located in the center of the hub plate 11.

The external spur gear 8 moves in an orbiting, non-rotating manner with respect to the rotation of the internal spur gear 10. Put another way, the external spur gear 8 is sized so that it fits inside the internal spur gear 10, but is not so large that it meshes completely with the internal spur gear. The center of the internal spur gear is offset from the center of the external spur gear by a distance known as the offset diameter. The eccentric ring 9 is shaped so that the output shaft 4 is coaxial with the hub plate 11.

The non-rotation of the external spur gear 8 is enforced through connection to a cross plate 6. The cross plate 6 is located generally between the top plate 2 and the external spur gear 8. Two cross guide pins 5 are mounted in the external spur gear. As shown here, the two cross guide pins are equally spaced from the geometric center of the external spur gear and are located on opposite sides of a line, so that the two cross guide pins are located 180° apart from each other. The pins extend from the external spur gear 8 into a first pair of elongated slots 42 in the cross plate 6. The portion of the cross guide pins 5 connected to the external spur gear 8 are round in cross-section, while the portion of the cross guide pins 5 extending into the slots of the cross plate 6 are square in cross-section. The slots confine the pins and allow orbital motion of the spur gear 8.

Similarly, two cross guide pins are mounted in the top plate 2 using fasteners 22. These pins extend from the top plate 2 into a second pair of elongated slots 44 in the cross plate. The portion of the cross guide pins 5 connected to the top plate 2 are round in cross-section, while the portion of the cross guide pins 5 extending into the slots of the cross plate 6 are square in cross-section. Again, the slots confine the pins and allow motion of the cross plate along only one axis. The first pair 42 and second pair 44 of elongated slots are perpendicular to each other. The combination of the pins extending from the top plate 2 to the cross plate 6, and the pins extending from the cross plate 6 to the external spur gear 8, prevent the external spur gear from rotating, but still allow orbital motion.

As the internal spur gear 10 rotates, its teeth engage corresponding teeth on the external spur gear 8. The external spur gear has fewer teeth than the internal spur gear. As a result, the center axis of the non-rotating external spur gear orbits faster than the internal spur gear. Due to this orbital motion of the external spur gear 8, the eccentric ring 9 rotates, causing the output shaft 4 to rotate as well. Again, the output shaft 4 is co-axial with the hub plate 11 due to the combination of eccentricities in the external spur gear 8 and the eccentric ring 9.

Figure 4:
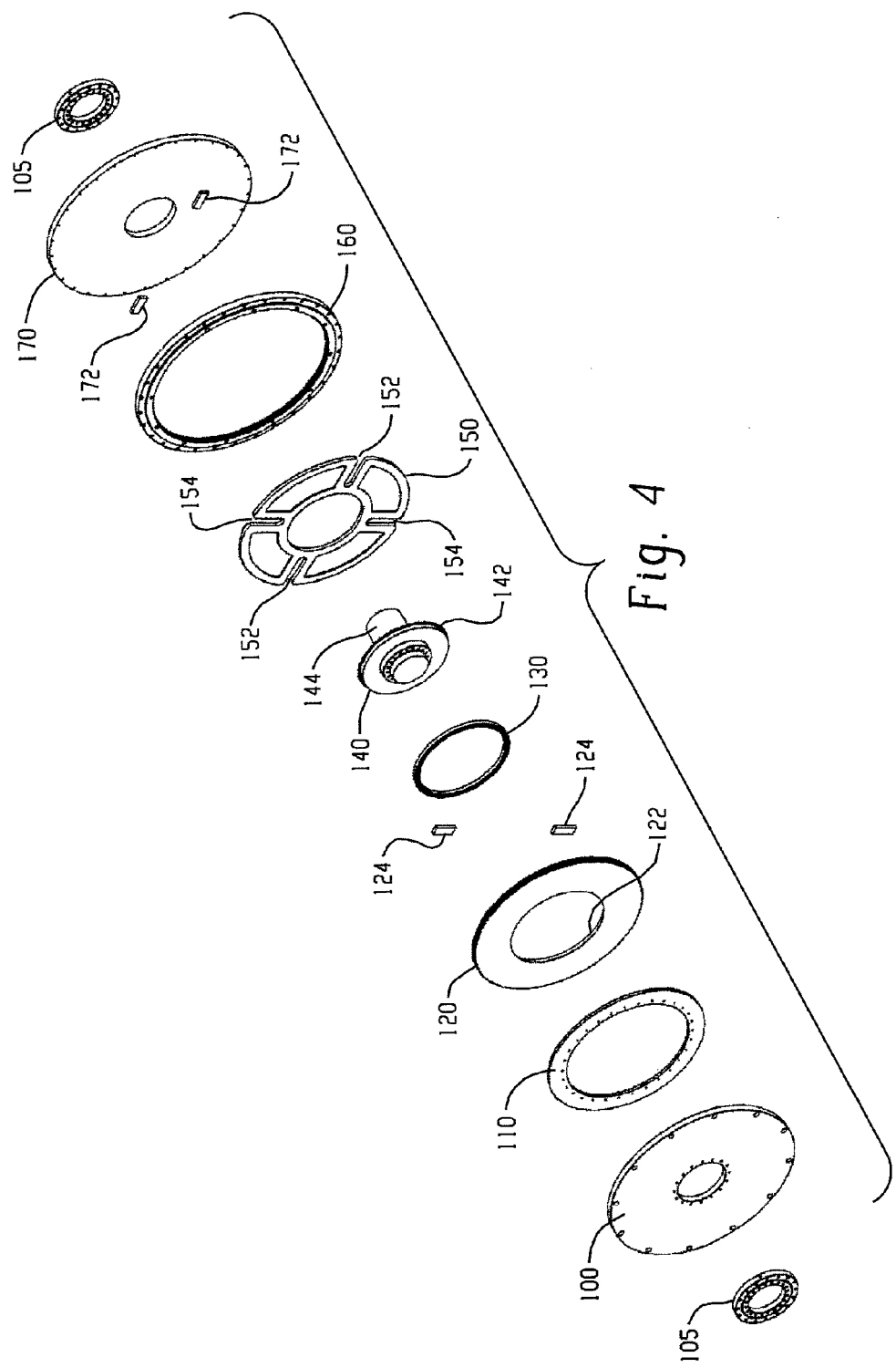
FIG. 4 is an exploded perspective view of the second exemplary embodiment of a speed increaser of the present disclosure.

Shown in FIGS. 3 and 4 are perspective views of another exemplary embodiment of the speed increaser. The gearing components are arranged between a hub plate 100 and a back plate 170. The hub plate 100 is mounted on a geared bearing 160. The hub plate 100 also transmits an input rotational load to the geared bearing 160. The geared bearing 160 has teeth on its inside face.

An inner gear 120 has teeth located on its outside face. The inner gear 120 has fewer teeth than the geared bearing 160. The inner gear is positioned inside, but not concentric with, the geared bearing 160 such that their gear teeth engage. The inner gear 120 moves in an orbiting, non-rotating manner with respect to the rotation of the geared bearing 160. The inner gear 120 contains a bore 122 and has a bore axis which is offset from the bore axis of the geared bearing 160 for a distance known as the offset diameter.

A bearing 130 is located within the bore 122. Located within the bearing 130 is an output assembly 140. The output assembly 140 comprises a ring 142 and an output shaft 144. The ring 142 also contains an offset diameter, such that the output shaft 144 and the hub plate 100 are co-axial. The bearing 130 provides a rotational slipping motion between the output shaft 144 and the bore 122 of the inner gear 120.

The ends of the output shaft 144 extend through bores in both the hub plate 100 and the back plate 170. The two ends are supported by two (2) sets of bearings 105.

The inner gear 120 is separated from the hub plate 100 by the thrust ring 110, which is bolted to the hub plate 1. The geared bearing 160 is also bolted or affixed to the hub plate 100, such that the thrust ring is within the geared bearing 160. The thrust ring 110 has a slightly smaller diameter than the inner gear 120, to ensure that the thrust ring does not contact the teeth of the inner gear as the inner gear orbits.

A swash plate 150 separates the inner gear 120 from the back plate 170 and fits within the diameter of the geared bearing 160. The swash plate 150 also prevents the inner gear 120 from rotating. The swash plate 150 is slotted on four quadrants to fit over the drive dogs. The drive dogs are square keys which mate with the slots on the swash plate 150. Two (2) of the drive dogs 172 are located on the back plate 170 and mate with slots 152. The other two (2) drive dogs 124 are located on the inner gear 120 and are rotated 90 degrees in orientation from the two (2) drive dogs 172 located on the back plate 170. Although the drive dogs 124, 172 are shown here as separate components, in this embodiment they may be made as integral parts of the inner gear 120 and back plate 170, respectively. The drive dogs 124 mate with slots 154 on the swash plate 150. This arrangement prevents the inner gear 120 from rotating, but allows the inner gear 120 to orbit.

The geared bearing 160 has a height such that the thrust ring 110, inner gear 120, and swash plate 150 are all contained within it. Put another way, when assembled and seen from the exterior, the hub plate 100, geared bearing 160, and back plate 170 may be visible, but the thrust ring 110, inner gear 120, and swash plate 150 need not be seen.

When a power source applies rotational force to the hub plate 100, the hub plate's bolted connection with the geared bearing 160 causes the geared bearing to rotate with the same rotational force and at the same rotational speed. Because the teeth of the inner gear 120 are engaged with the teeth of the geared bearing 160, the rotational forces on the geared bearing are transferred through the inner gear 120 to the drive dogs and the swash plate 150. Because the drive dogs and swash plate will not allow the inner gear 120 to rotate, the rotational forces in the geared bearing 160 act as a tooth separating force, pushing the inner gear in an orbiting motion around the output shaft 144. The orbiting motion and transferred force causes the output shaft 144 to rotate.

The resulting speed increaser has a gear ratio calculated by the number of teeth in the geared bearing 8, divided by the difference in number of teeth between the geared bearing 8, and the inner gear 2. The gear ratio may be from about 20:1 to about 100:1 (output:input).

Figure 5A:
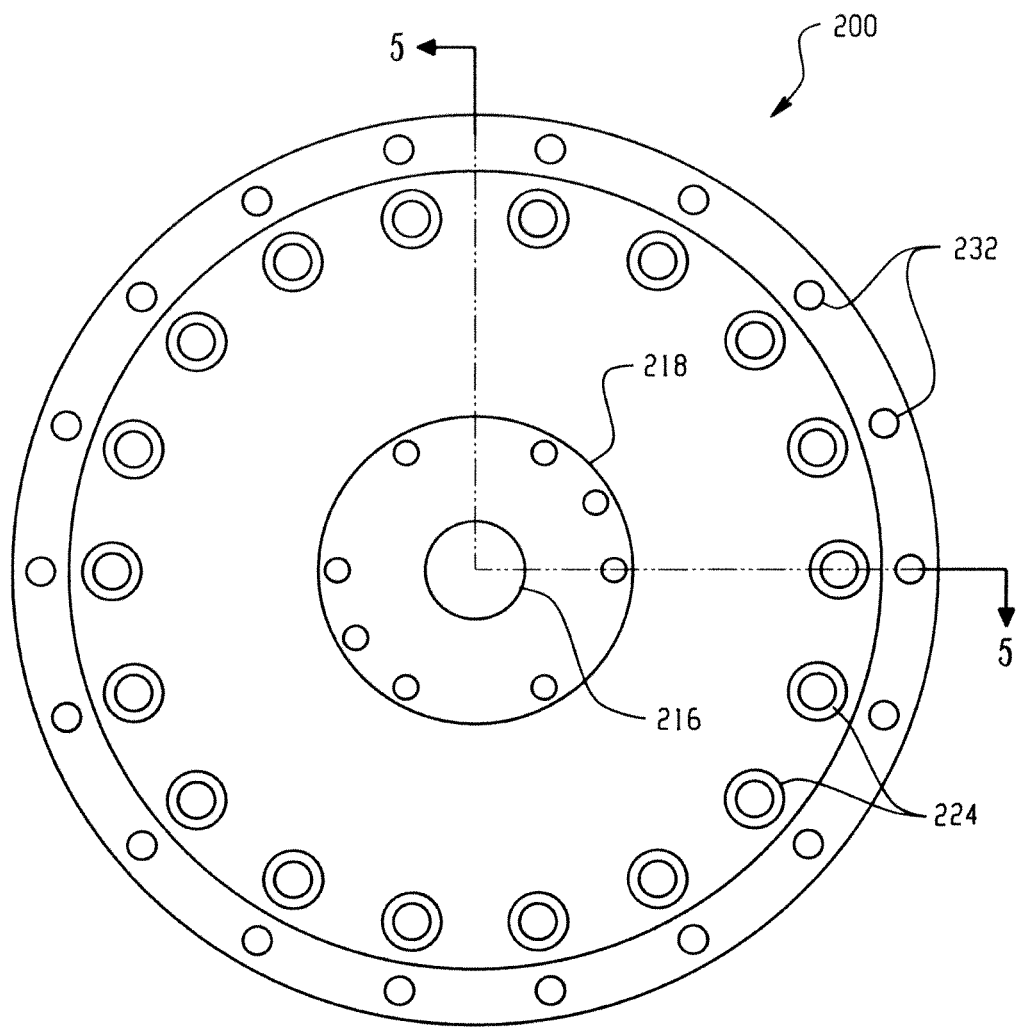
FIG. 5*a* is an end view of another version of the speed increaser of the present disclosure.
Figure 5B:
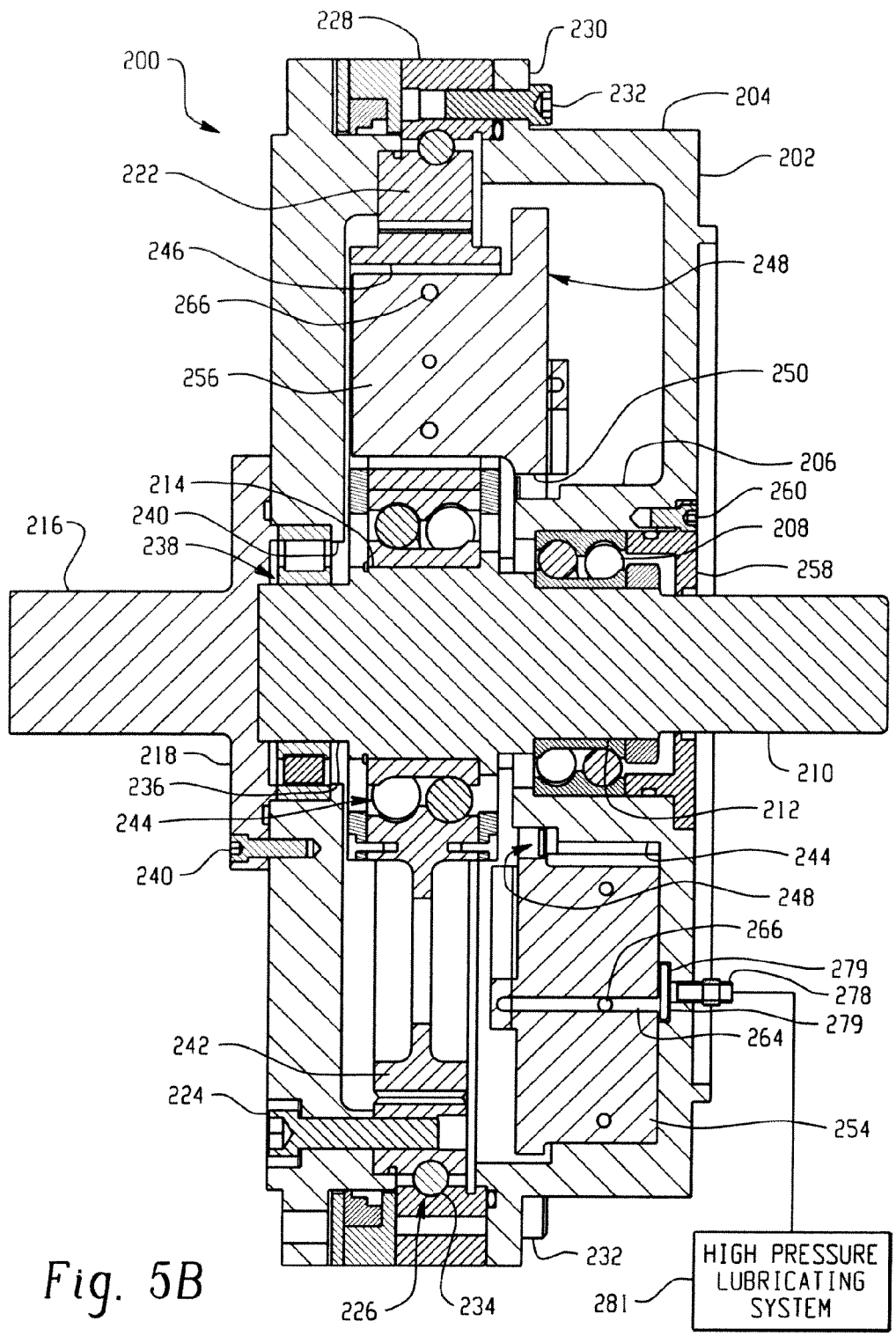
FIG. 5*b* is a cross section of the speed increaser of FIG. 5*a*.
Figure 6:
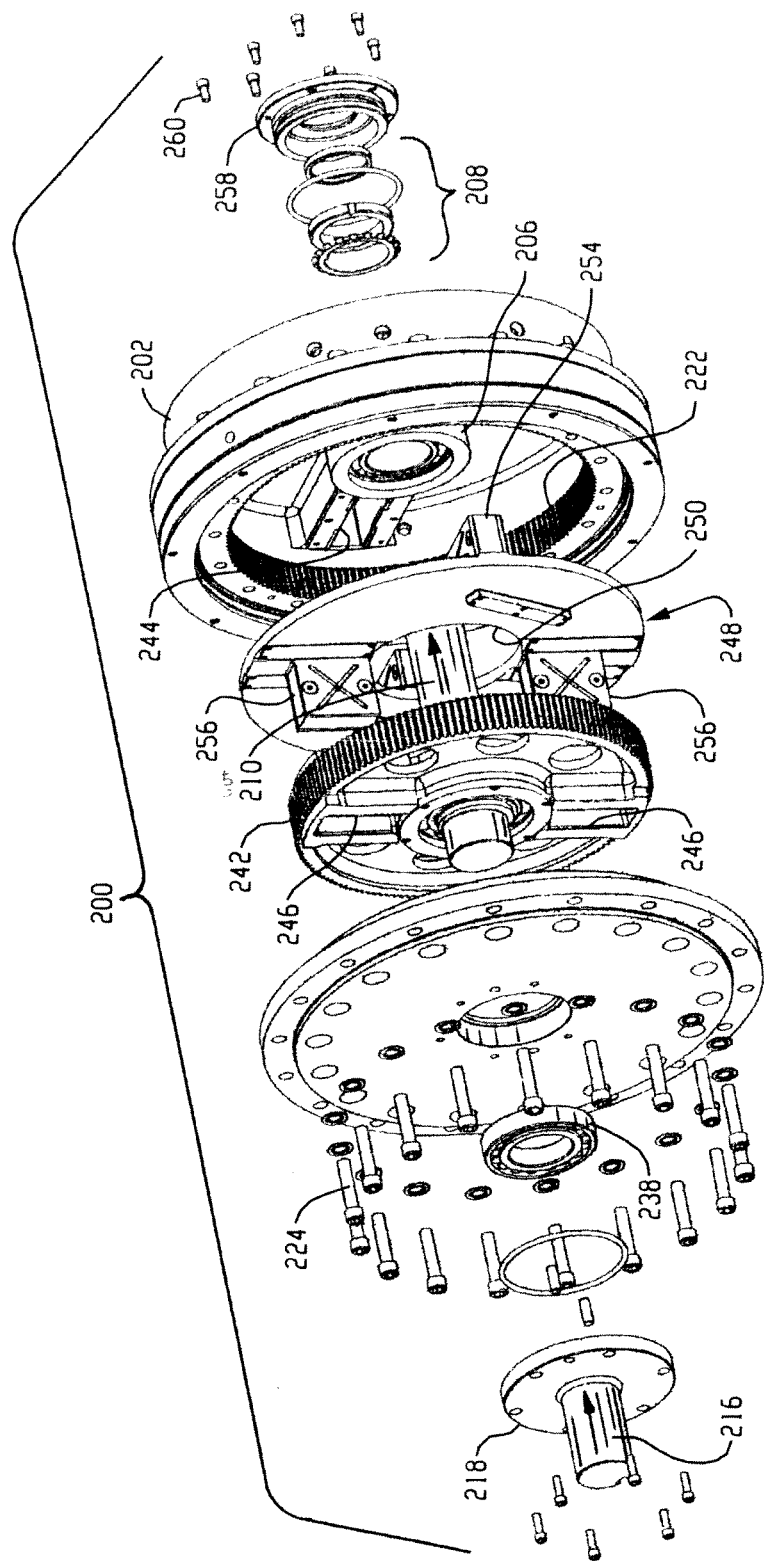
FIG. 6 is an exploded view of the speed increaser of FIG. 5.

Referring to FIGS. 5a, 5b and 6, another embodiment or version of the present disclosure is indicated generally at 200 and includes a housing 202 having a generally cylindrical wall portion 204 forming the outer periphery thereof and having an inner hub 206 which has a bearing assembly therein indicated generally at 208 which has journalled therein an output shaft 210. The shaft 210 has a raised diameter portion 212 which is received in close fitting engagement with the inner race of the bearing 208. Shaft 210 has axially spaced from diameter 212 an eccentric diameter 214 the amount of offset thereof which will be hereinafter described.

The speed increaser 200 has an input shaft 216 with a flanged hub 218 which is attached to a generally circular plate 220 extending radially outwardly therefrom which plate is attached adjacent its outer periphery to an internally toothed ring gear 222 by a plurality of circumferentially spaced fasteners such as cap screws 224. The ring gear is journalled on its outer periphery in a bearing indicated generally at 226 which bearing has the outer race thereof denoted by reference numeral 228 secured to a flange 230 formed on housing 202 by a plurality of fasteners such as cap screws 232. Bearing assembly 226 preferably includes a plurality of ball races denoted by reference numeral 234 but may alternatively comprise a plain bearing or other suitable bearing.

Shaft 210 has a diameter 236 formed on the end thereof which diameter is journalled by a bearing assembly indicated generally at 238 in a central bore 240 provided in the plate 220.

Thus, in operation, power inputted to shaft 216 causes plate 220 to rotate ring gear 222 in bearing assembly 226.

An externally toothed spur gear 242 is disposed within ring gear 222; and, the gear 242 has a bearing assembly indicated generally at 244 provided on the hub of gear 242 which bearing assembly has its inner race assembled in closely fitting engagement over the eccentric diameter 214 provided on the output shaft 210. The spur gear 242 has a pitch diameter of its teeth slightly less than the pitch diameter of the internal teeth on ring gear 222. It will be understood that the offset or eccentricity of the diameter 214 is equal to the difference in the pitch diameter of the ring gear teeth and the pitch diameter of the spur gear teeth.

Housing 202 has a pair of elongated cross guide slots 244 formed therein extending disposed in diametrally opposed radially extending orientation, one of which pair 244 is shown in FIGS. 5b and 6.

Spur gear 242 has a similar pair of diametrally opposed radially extending cross guide slots 246 formed therethrough, one of which is shown in FIG. 5b and both of which are shown in FIG. 6. A swash plate indicated generally at 248 has a clearance hole 250 formed centrally therein for clearing the hub 206 of the housing; and, the swash plate has a pair of diametrally opposed radially extending cross guide projections in the form of dogs or lugs 254 provided on the end of distal face thereof in FIG. 6 or right-hand face thereof in FIG. 5b with one of the pair of dogs 254 shown in FIGS. 5b and 6. The axially opposite face of the swash plate 248 or left-hand face in FIG. 5b and proximal face in FIG. 6 has a second pair of cross guide projections in the form of dogs or lugs 256 formed thereon in diametrally opposed relationship with both of the second pair of dogs 256 illustrated in FIG. 6. The pair of cross guide projections or dogs 254 slidingly engages the slots 244 in housing 202; and, the second pair of cross guide projections or dogs 256 slidingly engages the slots 246 in the spur gear 242. It will be understood that the pair of dogs 254 are diametrally arranged at 90° to the orientation of the dogs 256 to permit orbital movement of the spur gear 242.

Bearing assembly 208 is retained in the housing hub 206 by a collar 258 secured to the housing by cap screws 260.

In the present practice, it has been found satisfactory to form the swash plate and dogs integrally of titanium or aluminum material. The slots formed in the housing may have wear resisting inserts on the sliding surfaces thereof and formed of material with a pressure-velocity rating $$PV = \frac{\text{Applied Force } (N)}{\text{Projected bearing area } (m2)} \times \text{linear velocity (m/sec)}$$

of 275,000 125 KW unit. In the present practice, it has been found satisfactory to use a bronze alloy commercially available and sold under the designation "ToughMet® 3 AT110 Temper Plate" and obtained from the Brush-Wellman Company, Toledo, Ohio. In the present practice, the output shaft has been satisfactorily formed of titanium material; however, other suitable materials may be used. The orbital gear has been satisfactorily formed of SAE 1050 carbon steel hardened to about 20 to 24 on the Rockwell "C" scale; however, other suitable gear materials may be employed. The slots in the spur gear also may have bronze alloy insert plates (not shown) for providing wear resistance thereto.

Figure 7:
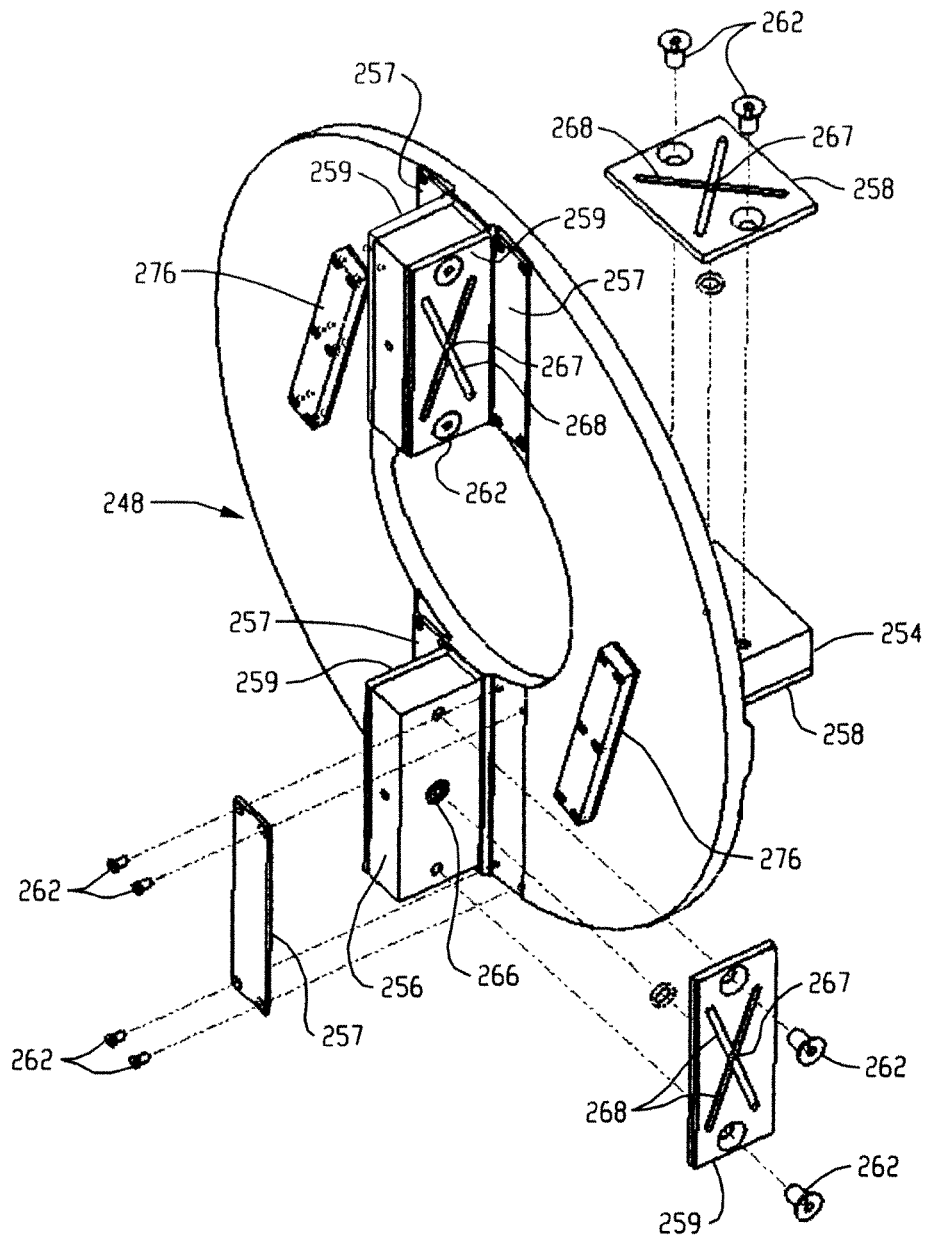
FIG. 7 is an exploded view of the swash plate of the speed increaser of FIG. 5.

Referring to FIG. 7, the swash plate 248 has the dogs 254 and 256 provided with hardened face plates denoted 258 for dogs 254 and 259 for dogs 256. The face plates may be retained on the dogs by threaded fasteners such as countersunk screws 262. In the present practice, it has been satisfactory to form the face plates on the dogs of AISI type 440 stainless steel hardened to a range of about 50-55 on the Rockwell "C" scale. However, other suitable hardened materials may be used. Additional wear plates 257 are mounted on the faces of the swash plate adjacent the dogs 254, 256 to axial lash and reduce friction between the swash plate and the housing.

Figure 8:
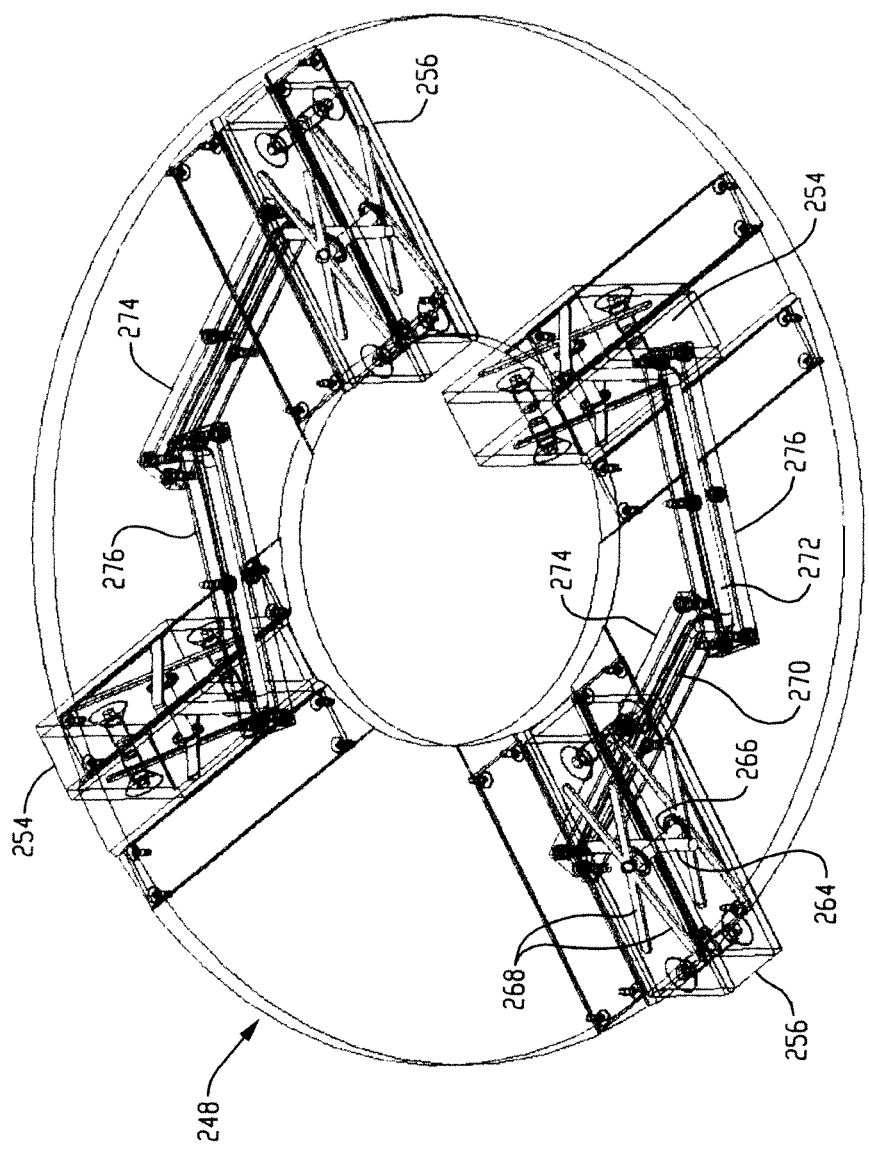
FIG. 8 is a phantom pictorial view of the swash plate of FIG. 7 illustrating the lubricant passages.

Referring to FIGS. 7 and 8, the swash plate dogs 254, 256 are shown as having a plurality of cross-bores shown shaded in FIG. 8 and denoted by reference numerals 254, 266 which are connected to opposite sides of the lugs and which intersect grooves 268 formed on the outer surface of the plates attached to the sides of the dogs. The cross-bores intersect grooves such as 270, 272 formed in external plates 274, 276 provided on the faces of the swash plate to provide continuous passages for lubricants. The cross-bores such as 264, 266 communicate with holes 267 in the wear plates (See FIG. 7) and feed lubricant to the plate grooves 268.

Figure 10:
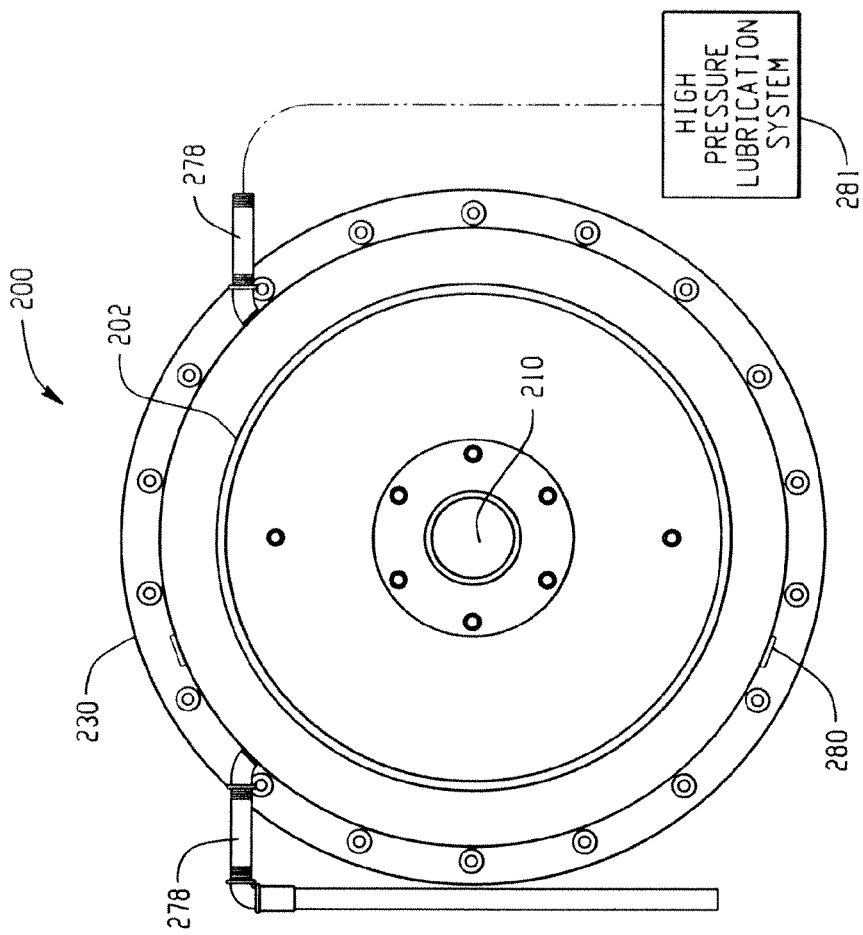
FIG. 10 is a view from the end of the output shaft of the speed increaser of FIG. 9.
Figure 9:
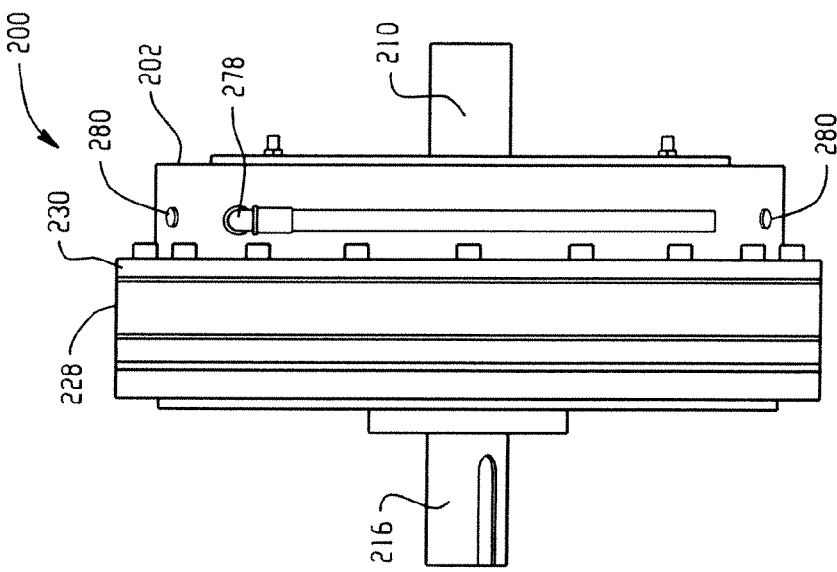
FIG. 9 is a side view of the version of FIG. 5 illustrating the lubricant supply and vent ports.

Referring to FIGS. 5b, 9 and 10, inlet ports 277 are provided in the housing and have supply fittings 278 attached thereto connected to a relatively high pressure lubricating system 281 adequate to provide a film of lubricant between the sliding cross guide projections and the slots in the ring gear and housing. The housing also has vent ports 280 provided therein. A lubricant face seal 279 is provided between the housing and the sliding dogs 254.

Figure 11:
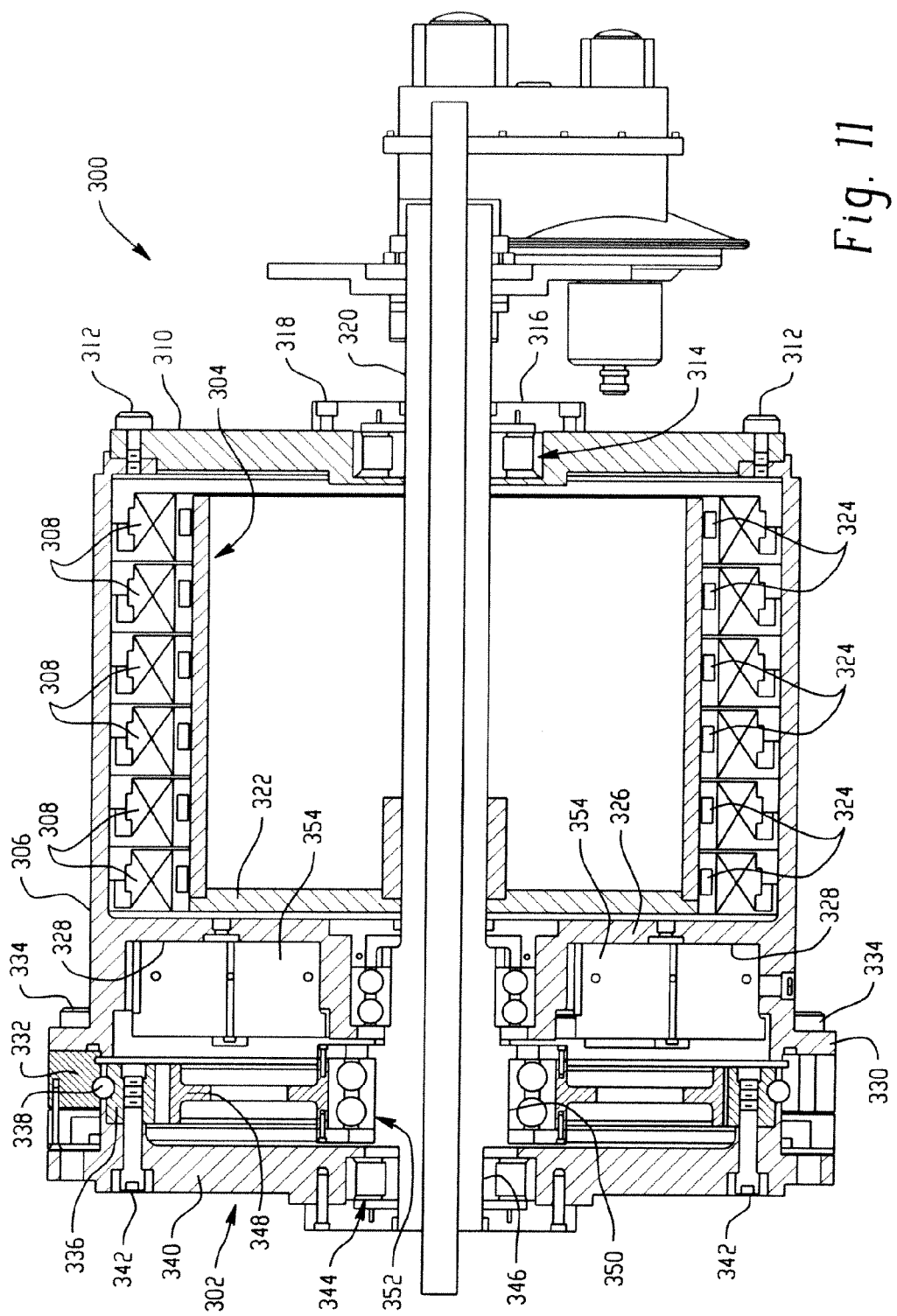
FIG. 11 is a cross-section of the speed increaser of FIG. 5 assembled with an electric generator.

Referring to FIG. 11, another embodiment of the speed increaser of the present disclosure is indicated generally at 300 and comprises the speed increaser indicated generally at 302 integrated with an electrical generator indicated generally at 304 assembled in a common housing 306 which has a plurality of generator stator windings 308 disposed on the interior thereof. The housing has an end wall portion 310 which may comprise a separate plate attached thereto by fasteners such as cap screw 312 and which has a central bearing assembly indicated generally at 314 and which is retained by a retaining collar or plate 316 secured to the end plate 310 by suitable fasteners 318.

Bearing 314 has one end of the hollow output shaft 320 journalled therein. The output shaft 320 has a rotor 322 mounted thereon for rotation therewith and which rotor includes generator magnets 324 disposed for, upon rotation of shaft 320, generating current in the stator windings 308. The output shaft 320 extends continuously through the speed increaser 302 and has the opposite end thereof journalled therein as will hereinafter be described.

Housing 306 has a radially inwardly extending flange portion 326 which has formed therein a pair of diametrally opposed radially extending cross guide slots 328. Housing 306 also has a radially outwardly extending flange 330 onto which is secured an outer bearing race ring 332 by suitable fasteners, such as circumferentially spaced cap screws 334. The outer bearing race 332 has journalled therein the outer periphery of an internally toothed ring gear 336 for rotation on bearings 338 with respect to the outer race 332. The ring gear has securely attached thereto for rotation therewith an input member or hub plate 340 and retained thereon by suitable fasteners such as cap screws 342. The input member 340 has a centrally disposed bearing assembly indicated generally at 344 and into which is journalled the opposite end of output shaft 320 on the reduced diameter portion 346 thereof. It will be understood that the input member is connected to a source of rotary power such as the impeller of a fluid turbine or a hydraulically operated motor.

An externally toothed orbital spur gear 348 is disposed within the ring gear 336 and is journalled about an eccentric diameter 350 on the output shaft by a suitable bearing assembly indicated generally at 352. The spur gear has a pair of diametrally opposite radially extending cross guide slots (not shown in FIG. 11) into which are received a pair of cross guide dogs (not shown in FIG. 11) extending from an axial face of a swash plate (not shown) having a pair of cross guide dogs 354 extending into the slots 328 in the housing in a manner similar to the arrangement of the speed increaser of FIG. 5. The construction of the ring gear and spur gear is similar to that of the version of the speed increaser shown in FIG. 5. Rotation of the input member 340 causes rotation of the ring gear 336 which effects non-rotating orbiting of the spur gear 348 and driving of output shaft 320.

Figure 12:
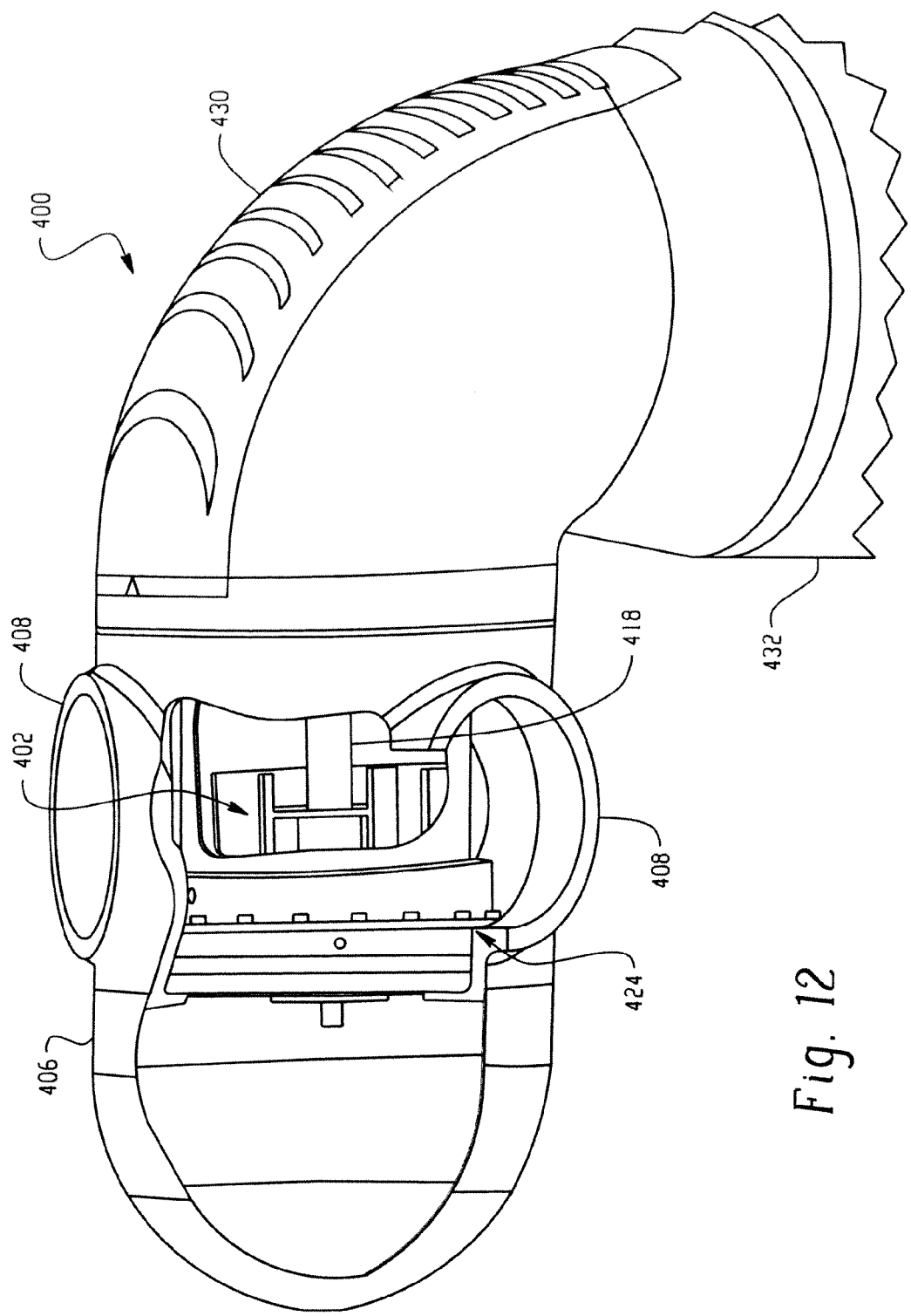
FIG. 12 is a view of the version of FIG. 11 incorporated in the hub of a fluid turbine with portions of the housing broken away and mounted on a support.
Figure 13:
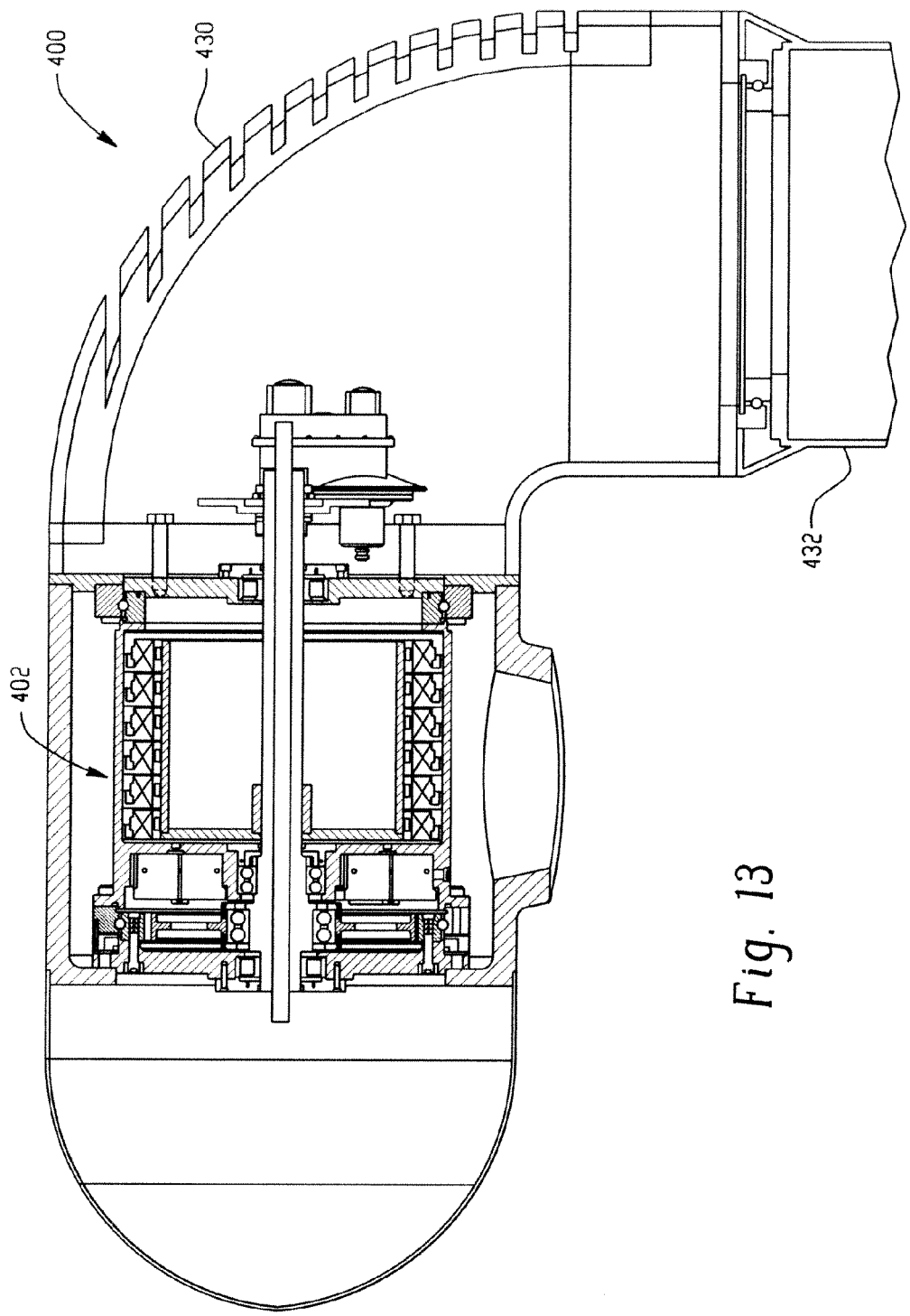
FIG. 13 is a cross-section of the impeller hub speed increaser and generator of FIG. 12.
Figure 14:
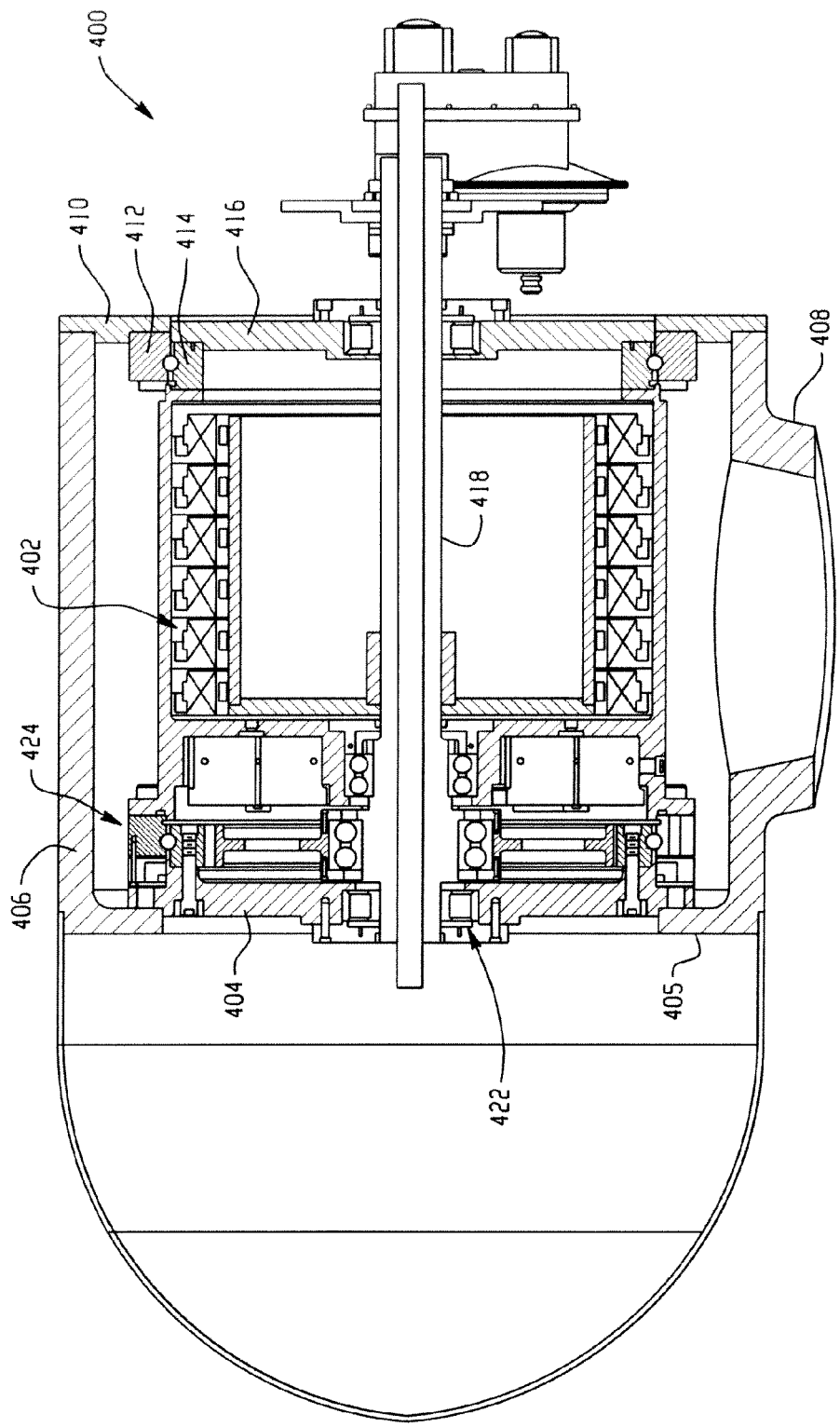
FIG. 14 is an enlarged cross-section of the impeller hub speed increaser and generator of FIG. 13.

Referring to FIGS. 12, 13 and 14, another version of a combination speed increaser and generator is indicated generally at 400 and includes a generator assembly indicated generally at 402 which has the input member 404 thereof attached on inward flange 405 of to the hub 406 of a fluid turbine impeller which has apertured attachment bosses such as boss 408 formed thereon for securing fluid turbine blades (not shown) thereon. The hub 406 is received over the generator 402 and attached to an end ring 410 which has an outer bearing race 412 secured thereto which is journalled on an inner bearing race 414 attached to an end plate 416 of the housing for the generator 402.

The output shaft 418 has one end journalled in the end plate 416 by a bearing assembly 420; and, the opposite end of shaft 418 is journalled by bearing assembly indicated generally at 422 for rotation with respect to the impeller of 406. It will be understood that the construction and operation of the speed increaser indicated generally at 424 is otherwise similar to that of the versions of FIG. 11. The embodiment or version 400 thus permits the speed reducer and generator to be housed completely within the impeller hub of a fluid turbine.

As shown in FIG. 13, the version 400 may be attached to a support housing such as housing 430 which may be rotatably mounted on a tower 432. In the arrangement of the version 400, it will be understood that the impeller hub may contain servo-motors (not shown) for changing the pitch of the unshown blades; and, therefore, the hollow tubular output shaft 418, which extends the full length of the generator and speed increaser, permits power leads to be supplied through the hollow output shaft.

Thus, the speed increaser of the present disclosure is compact, and quite lightweight for a given power handling capacity.

Figure 15:
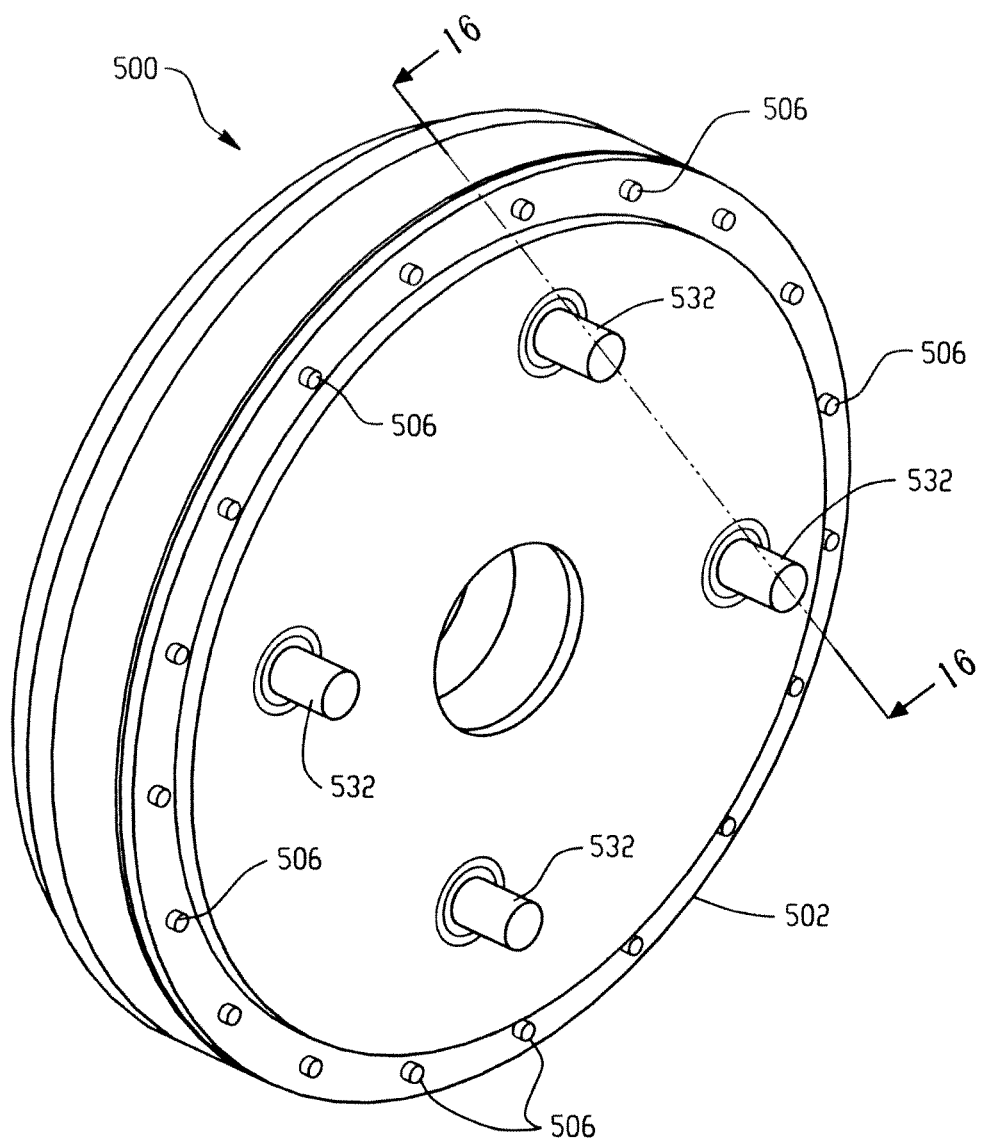
FIG. 15 is a perspective view of a version of the speed increaser of the present disclosure having multiple output shafts.
Figure 16:
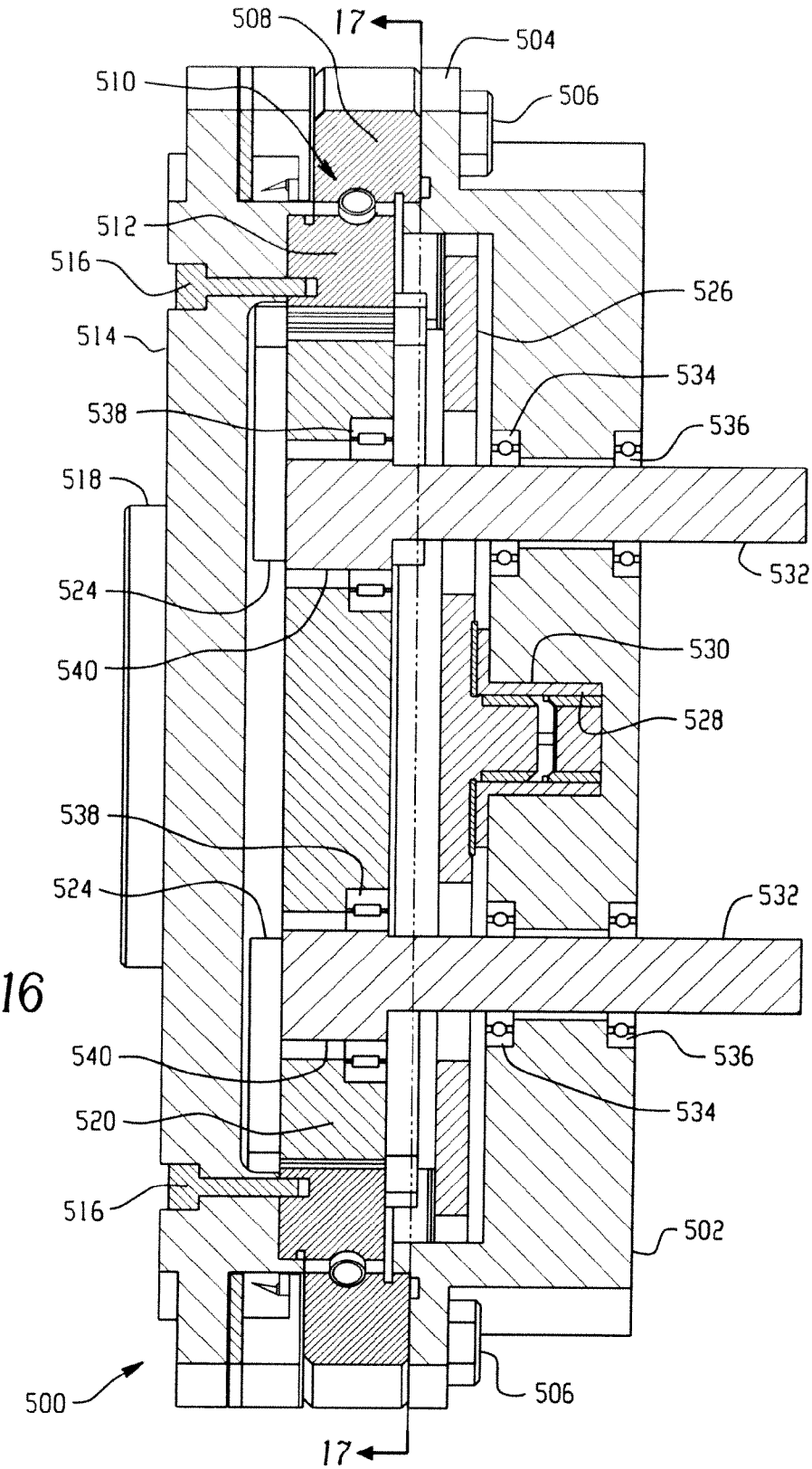
FIG. 16 is a cross-section taken along the section indicating lines 16-16 of FIG. 15.
Figure 17:
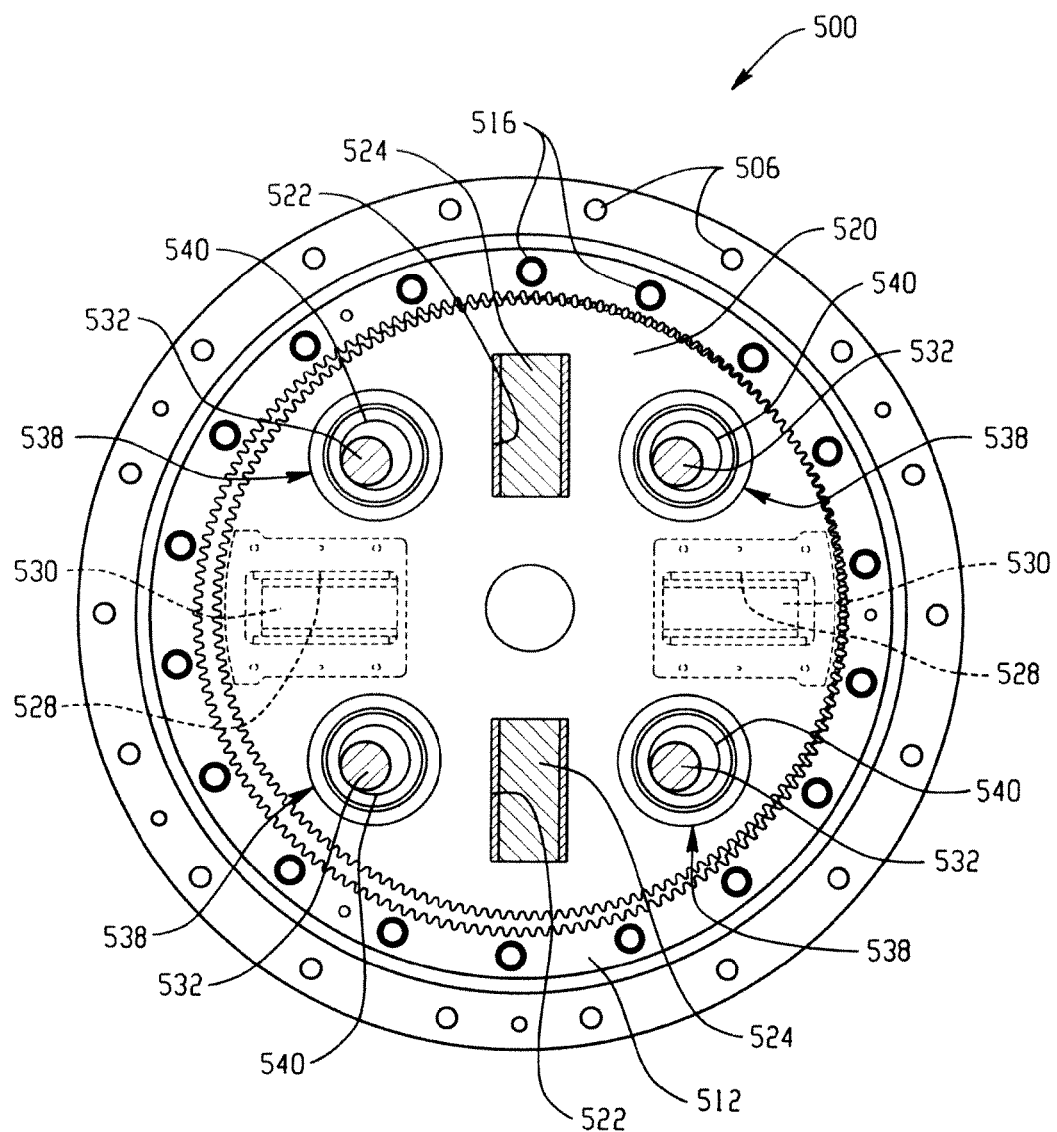
FIG. 17 is a section view taken along section indicating lines 17-17 of FIG. 16.

Referring to FIGS. 15, 16 and 17, another version of the present transmission employed as a speed increaser of the present disclosure is indicated generally at 500 and includes a housing 502 with a radially outwardly extending flange 504 which has attached thereto by suitable fastening means, for example, cap screws 506, an outer bearing race 508 which has journalled on its inner periphery by suitable bearings indicated generally at 510, the outer periphery of an internally toothed ring gear 512. An input member in the form of a circular plate 514 is attached to the ring gear by suitable fasteners such as cap screws 516; and, the input member 514 has a central hub 518 which is adapted for connection to a source of power as, for example, the impeller of a fluid turbine or hydraulic motor.

Disposed within the internally toothed ring gear 512 is an externally toothed spur gear 520 which has a plurality of diametrally opposed slots 522 formed therein into which are received cross guide dogs or lugs 524 extending from a swash plate 526. Similar slots 528 are formed in the housing 502, shown in dashed outline in FIG. 7, into which are received cross guide dogs or lugs 530. The slots 522 in the spur gear 520 are disposed at right angles to the slots 528 in the housing.

The housing 502 has disposed thereabout in spaced arrangement a plurality of output shafts 532, each of which has an end thereof journalled in a pair of bearings 534, 536 and extending outwardly of the housing 502. The opposite end of each shaft 532 has an eccentric 540 formed thereon which is journalled in bearings 538 provided in the spur gear 520. In operation, rotation of the input member 514 and ring gear 512 effects orbiting of the spur gear 520 in a non-rotating manner within ring gear 512 and effects rotary movement of each of the output shafts 532. Thus, the embodiment 500 provides for multiple output shafts driven by a single input shaft utilizing a single non-rotating orbiting spur gear for effecting speed increasing of each of the multiple output shafts 532. The embodiment 500 has particular application for connection to fluid turbine generators such as wind generators in that smaller capacity generators may be driven by each of the output shafts enabling some of the generators to be disabled while others remain operative, such as during high wind conditions.

In the present practice, an exemplary speed increaser and generator according to the present disclosure with a power output of 120 KW has an output shaft with a diameter of about 76 mm, a ring gear pitch diameter of about 482 mm, a speed ratio of 80:1 and weighs about 585 lbs (265 Kg), a speed increaser-generator with a power output of about 600 KW has a ring gear pitch diameter of about 122 cm and an output shaft diameter of about 152 mm.

Referring to FIGS. 18 through 25, another version of the speed increaser is indicated generally at 600 and has an annular input member or powered ring 602 journalled for rotation on a housing indicated generally at 604 which comprises symmetric half shells or casings 606, 608 each having an outer bearing race respectively 610, 612, each of which has a plurality of circumferentially spaced bearings 616, 618 respectively against which an inner axially extending flange portion 620 of ring 602 is journalled. The annular input member or powered ring 602 has a plurality of internal teeth 622 formed about the inner periphery thereof and thus comprises a ring gear. In the present practice, for a 250 KW speed increaser, the casings 606, 608 have an outer diameter of about 26" (660 mm); and, the annular power input member or powered ring gear 602 has teeth with a pitch diameter of about 19" (482 mm).

Figure 20:
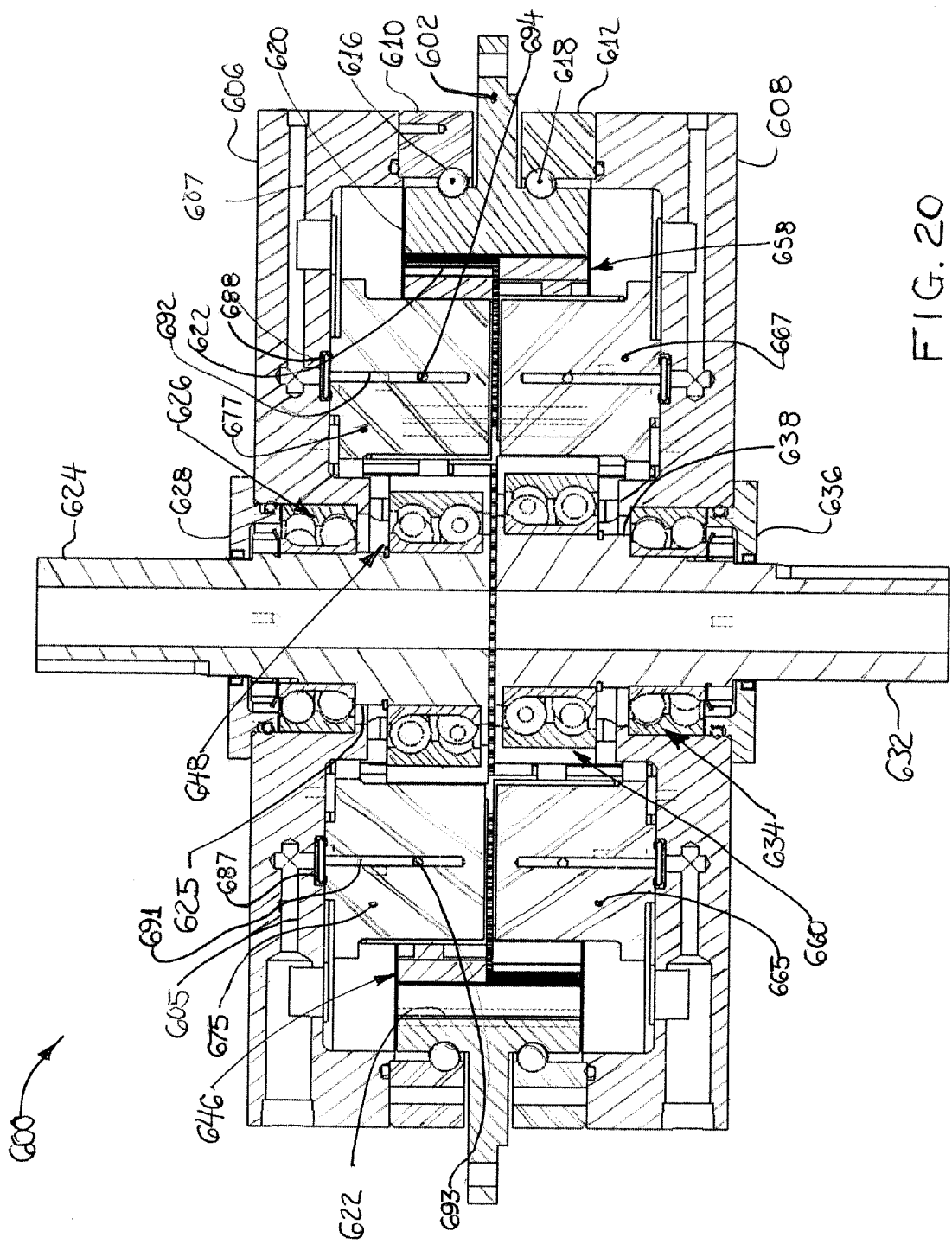
FIG. 20 is a section view taken along section indicating lines 20-20 of FIG. 19.
Figure 21:
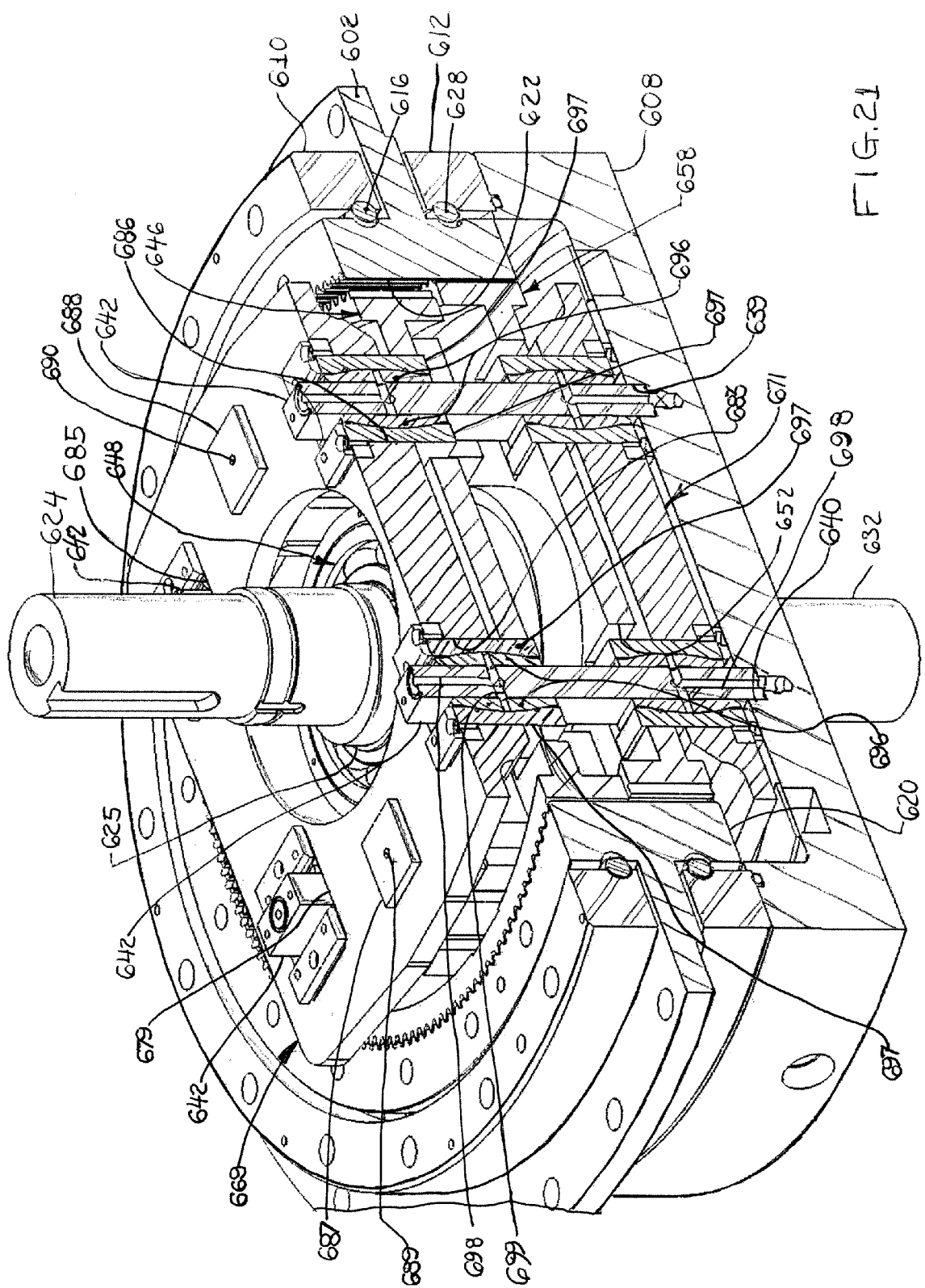
FIG. 21 is another perspective view sectioned along section indicating lines 21-21 of FIG. 19.
Figure 22:
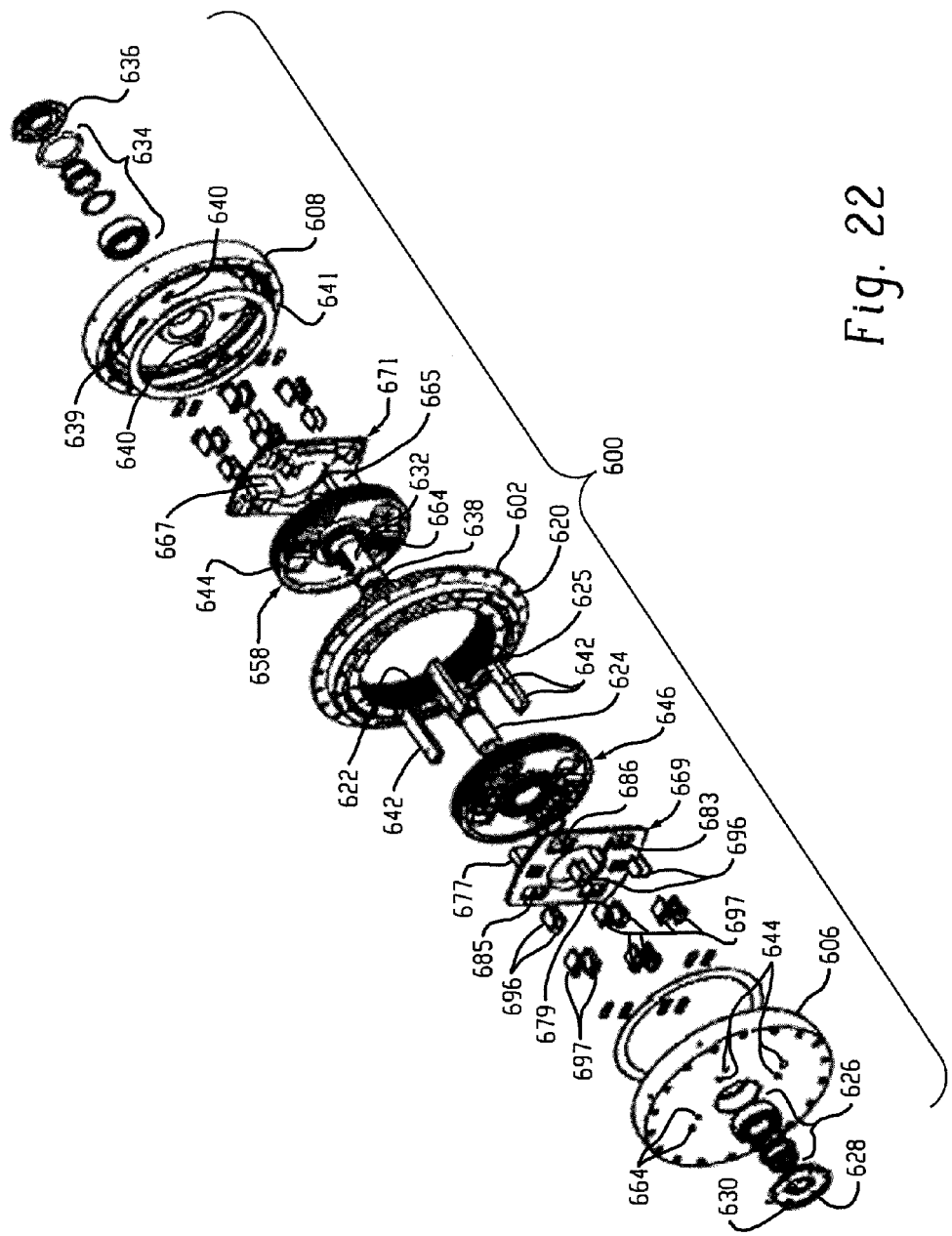
FIG. 22 is an exploded view of the speed increaser of FIG. 18.
Figure 23:
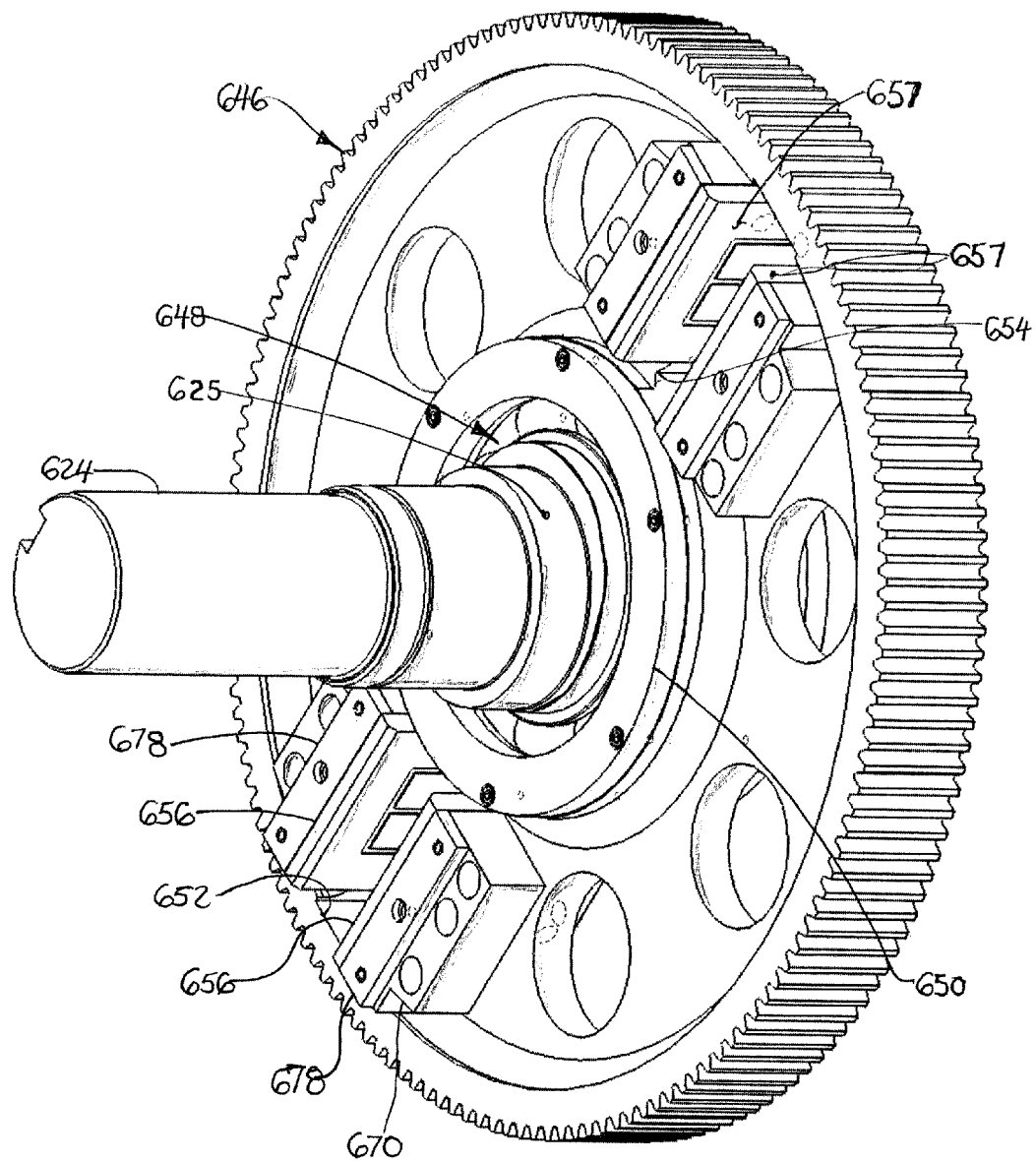
FIG. 23 is a perspective view f one of the spur gears of the transmission of FIG. 18.

Referring to FIGS. 20, 21 and 22, the speed increaser 600 has a first or left-hand power output member in the form of half shaft 624 which is journalled for rotation in housing 602 by a bearing assembly indicated generally at 626, which is retained by a r flange 628 on the half shell or casing 606 such as, for example, by fasteners (not shown) received through holes 630 provided in the flange 628. The power output member 624 has provided its inner end which extends through the casing bearing 626, an eccentric surface 625. In the present practice, for a 250 KW speed reducer, the power output shaft secured in the pockets 640 in the respective casing 606, 608 by unshown fasteners received through holes such as holes 644 shown in casing 606 (see FIGS. 19, 22).

Referring to FIGS. 20-23, an orbiting non-rotating spur gear indicated generally at 646 is journalled for rotation on eccentric surface 625 by a bearing assembly indicated generally at 648 and retained on the gear by retaining flange 650. Gear 646 has teeth thereon operative to orbitally engage teeth 622 of power input member 602. In the present practice it has been found satisfactory to provide clearance for the non-engaging teeth of the orbiting gear 646 during its orbital movement by the following formula:

|  |  |  | Units |
|---|---|---|---|
| Operator Input | | | |
| External Gear - # of teeth | Te | (#) | |
| Internal Gear - # of teeth | Ti | (#) | |
| Pitch | P | (#) | |
| Pressure Angle | $\phi 1$ | (degrees) | |
| Addendum | A | (%) | |
| Calculated Gear Data | | | |
| Addendum Dimension | Ad | (inches) = | $(1/P) *A$ |
| Gear Ratio | GR | (#):1 = | $Ti/(Ti - Te)$ |
| External Outer Radius | R01 | (inches) = | $((Te/P)/2) + Ad$ |
| Internal Ini Radius | R1 | (inches) = | $((Ti/P)/2) - Ad$ |
| External Base Radius | Rb1 | (inches) = | $(Te/(2*P))*cos(radians(\phi 1))$ |
| Internal Base Radius | Rb2 | (inches) = | $(Ti/(2*P))*cos(radians(\phi 1))$ |
| Involute Pressure Angle | Inv. $\phi 1$ | (degrees) = | $tan(\phi 1*0.01745) - (\phi 1*0.01745)$ |
| Eccentricity | C | (inches) = | $(((Ti/P) - (Te/P))/2)$ |
|  | E1 | (degrees) = | $((acos(radians(((R1*R1) - (R01*R01) - (C*C)))/(2*C*R01)))/.0174532$ |
|  | E2 | (degrees) = | $(Te/Ti)*E1$ |
|  | $\phi t1$ | (degrees) = | $((asin((R01*(sin((E1*0.0174532925))))/R1)) - E2)/.0174532$ |
|  | $\phi 01$ | = | $((acos((Rb1/R01))/.0174532$ |
|  | Inv. $\phi 01$ | = | $tan(\phi 01*0.0174532) - (\phi 01*0.0174532)$ |
|  | $\phi$ | = | $(Te/Ti)*(Inv. \phi 01 - Inv. \phi 1)$ |
|  | $\delta$ | = | $((Te/Ti)*(Inv. \phi 01 - Inv. \phi 1) + Inv. \phi 1$ |
|  | X2 | = | $\delta - (\phi t1*0.01745)$ |
|  | $\phi 2$ | (degrees) = | $((acos(Rb2/R1))/.0174532$ |
|  | X1 | = | $tan(\phi 2*0.0174532) - (\phi 2*0.0174532)$ |
| Gear Tip Clearance | CL | (inches) = | $((X2 - X1)*R1)*.001$ |

624 has a diameter of about 3" (76 mm); and, the eccentric surface 632 has an eccentricity with respect to axis rotation of shaft 624 of about ¼" (6.4 mm).

A corresponding right-hand oppositely disposed power output member in the form of a half shaft 632 is journalled for rotation about a common axis with half shaft 624 in a bearing assembly indicated generally at 634 retained by a suitable flange 636 in the right-hand half shell or casing 608. The portion of right-hand power output shaft 632 extends inwardly of the housing 604 and casing 608 and has an eccentric surface 638 provided thereon which has a similar eccentricity of about ¼" (6.4 mm) with half shaft 632 having a diameter similar to that of power output shaft 624.

Casing 608 has a plurality of spaced recesses or pockets 640 formed on the inner face thereof, as shown in FIG. 22; and, in the present practice four such recesses or pockets. The pockets 640 each have received therein and secured thereto one end of a support bar 642, which bars extend through the annular ring gear 602 and other internal components of the speed increaser as will hereinafter be described in greater detail. The opposite end of each of the bars 642 is received in a corresponding pocket (not shown) in the remaining casing or half shell 606 and secured therein for supporting the casing 606 on the casing 608. In the present practice, the bars 642 are Spur gear 646 is shown in greater detail in FIG. 23 as having a pair of diametrally oppositely disposed slots 652, 654 through which two of the bars 642 pass respectively and which have anti-friction pads respectively 656, 657 provided therein.

A second non-rotating orbital spur gear indicated generally at 658 is journalled for rotation on eccentric surface 638 by a bearing assembly indicated generally at 660 retained on the spur gear 658 by a suitable retaining flange. In the present practice, gear 658 is identical to gear 646 and oppositely disposed with respect thereto and also orbitally engaging the teeth 622 of the powered input ring gear 602. Gear 658 has oppositely disposed slots 664 (see FIG. 22) provided therethrough and diametrally opposed.

At assembly, the power output shaft 624, 632 are assembled such that the maximum eccentricity of the surfaces 632, 638 are diametrally opposed such that the spur gears 646, 658 orbit 180° out-of-phase within ring gear 602.

Figure 24:
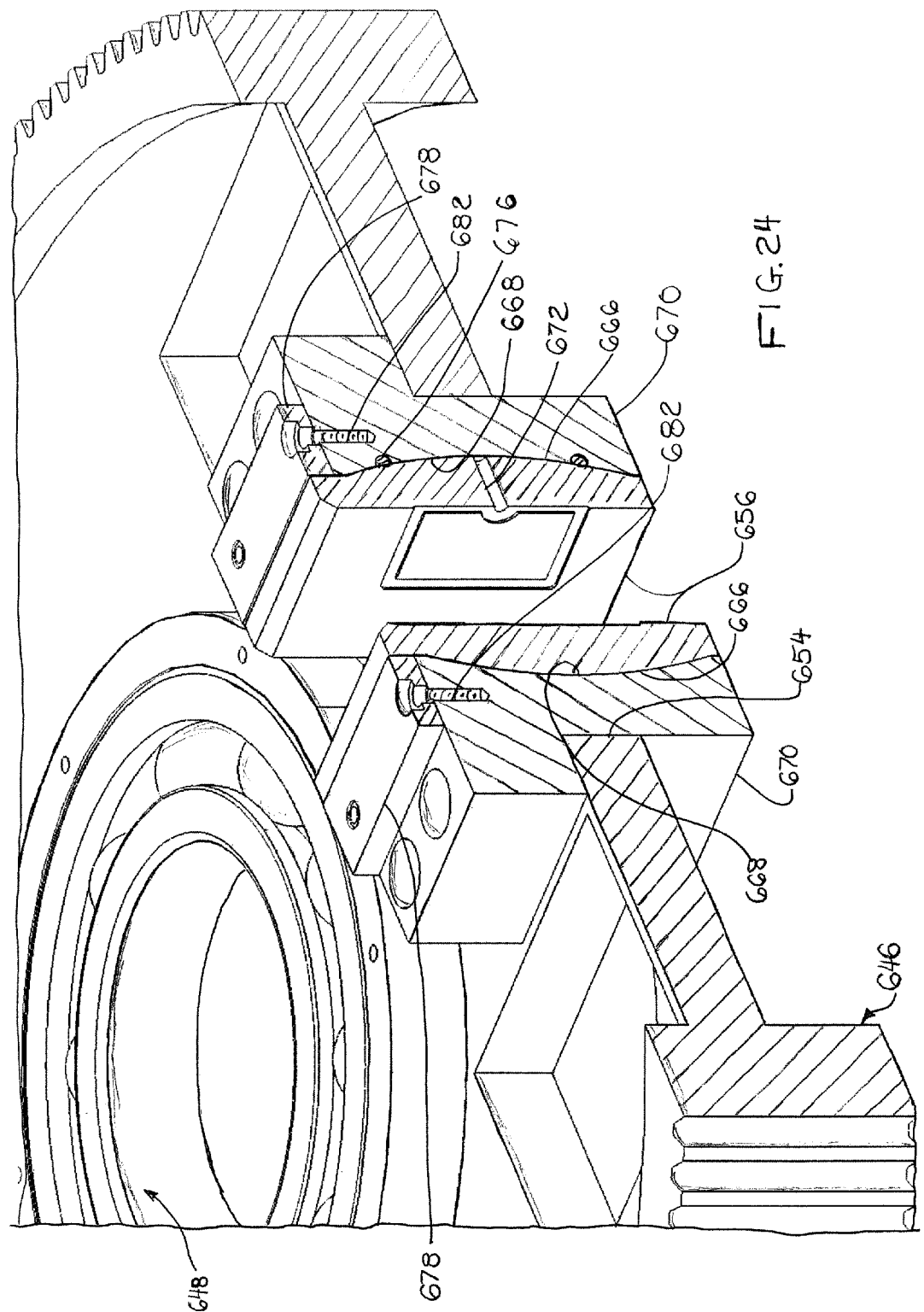
FIG. 24 is an enlarged perspective view of a portion of the gear of FIG. 23.
Figure 25:
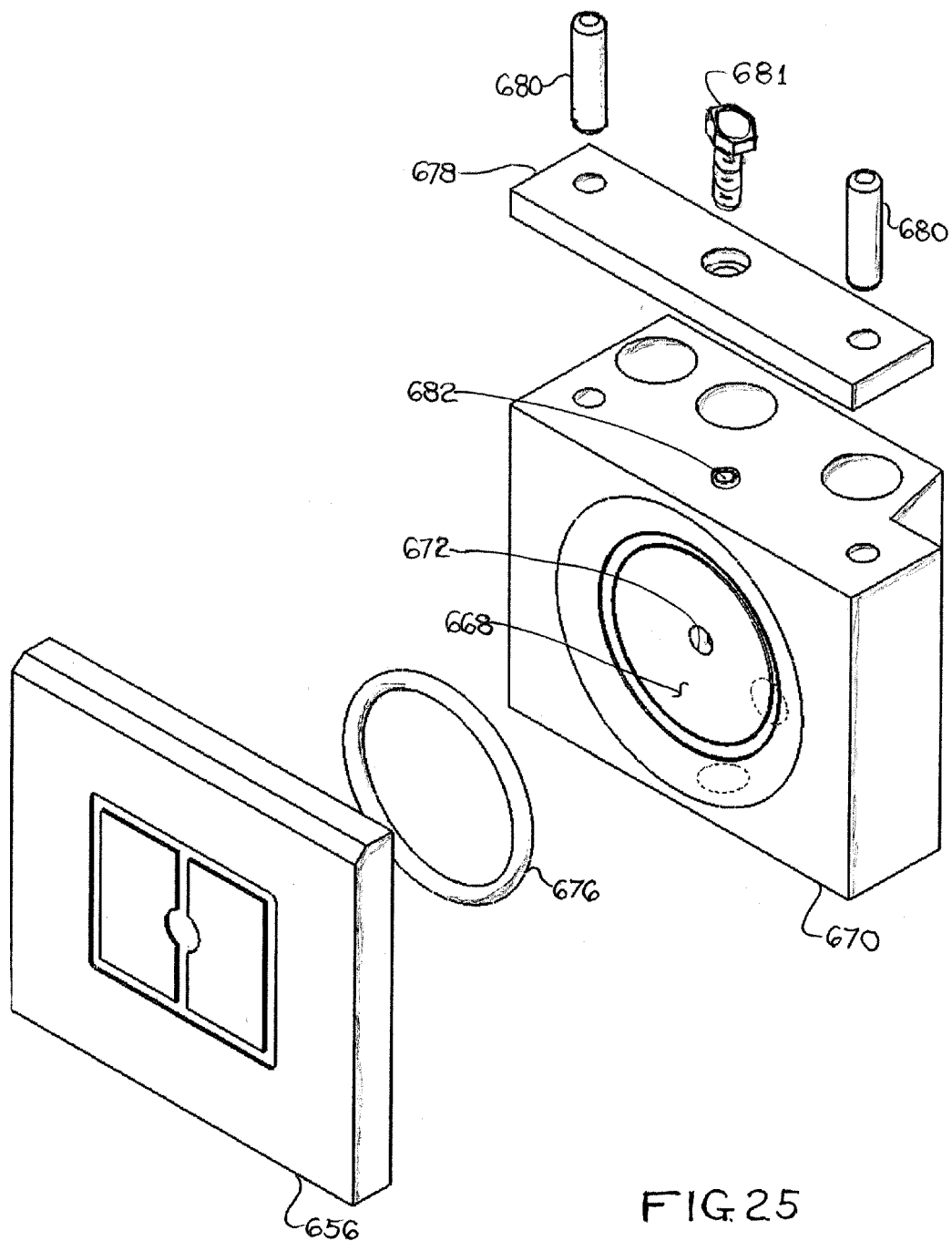
FIG. 25 is an enlarged exploded view of a portion of FIG. 24.

Referring to FIGS. 24 and 25, the anti-friction wear pad installation is shown typically for the wear pads 656 for gear 646, however, it will be understood that the illustrations of FIGS. 24 and 25 is typical for wear pads of the slots for both gear 646 and gear 658.

Each of the anti-friction wear pads typically 656 has a spherical surface 666 on the back face thereof which is in contact with a corresponding concave spherical surface 668 provided in a mounting block 670. One of the wear pads 666 has a lubricant port 672 for supplying lubricant from the wear face thereof to the spherical surface 668. The spherical surface 666 on the wear pad is sealed in the spherical recess 668 by a suitable seal ring 676 such that lubricant only is fed through the spherical face of one of the pair of pads 656. The lubricant gallery for the oppositely disposed pad 656 does not have a seal such that the pressure of the lubricant provides a force against only one of the pads for taking up any lash and maintaining the pads in contact with the friction surface of a swash plate lug to be hereinafter described. The block 670 has thrust bearing or face pads 678 accurately located on the block 670 by pins 680 received therethrough and retained by a fastener such as bolt 681 engaging threads 682 in block 670.

Referring to FIGS. 20, 21, 22 and 26-29, the details of the swash plate for each of the spur gears 646, 658 are indicated generally at 669, 671 respectively with plate 669 shown in greater detail in FIGS. 26-29; and, it will be understood that plate 671 is identical in construction with plate 669. The swash plates 669, 671 each have a central clearance aperture denoted 673 in FIG. 28 for the shaft 624 and shaft 632 with respect to plate 671. The plates 669, 671 each have a pair of diametrically oppositely disposed lugs extending from the axially inner face thereof as denoted for swash plate 669 by reference numerals 675 and 677 in FIGS. 26-29. The tabs 675, 677 are received between the wear pads of the spur gear 646 with lug 675 extending between the wear pad 656 and the lug 677 extending between the wear pad 657 (see FIG. 23) of the spur gear. It will be understood that the lugs 675, 677 extend further in a radial direction than the length of the wear pads such that the spur gear 646 can slide on the lugs 675, 677 in a direction along a diametral line connecting the two lugs.

Figure 26:
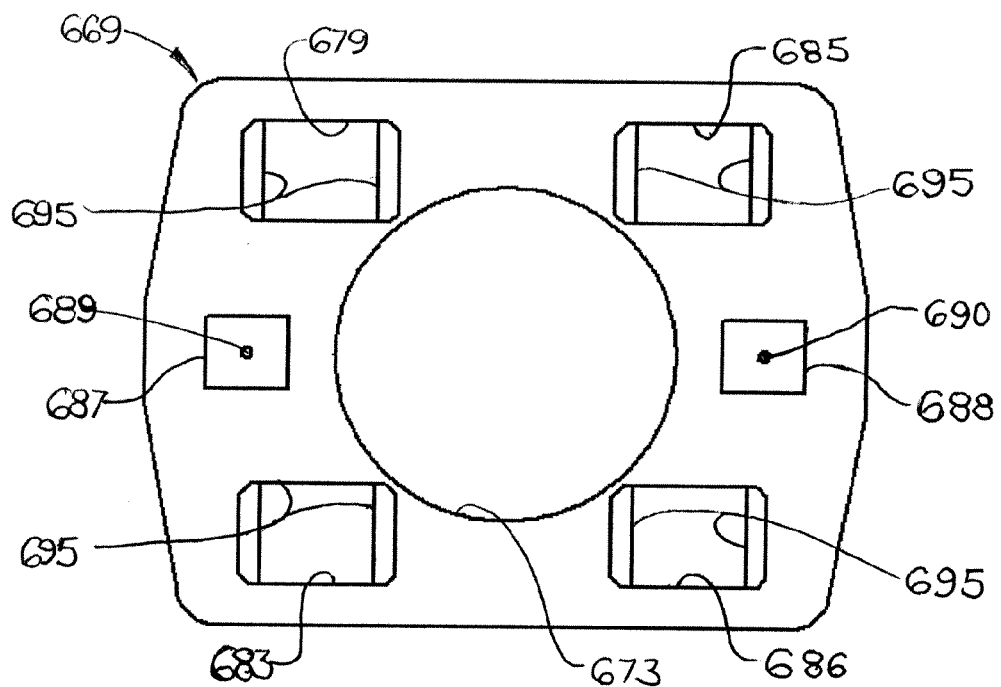
FIG. 26 is a plan view of one of the swash plates of the transmission of FIG. 18.
Figure 27:
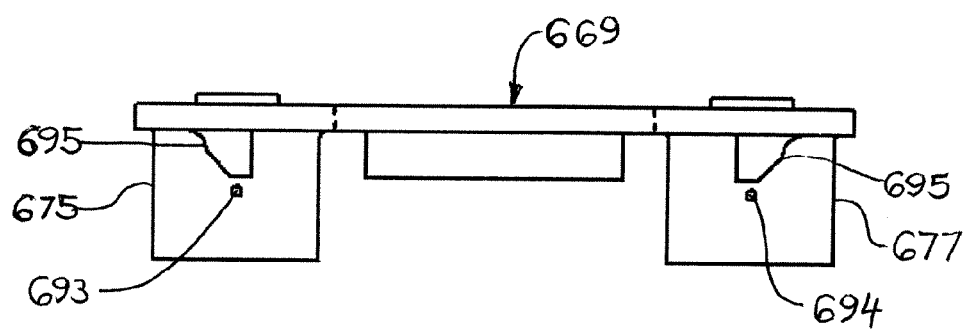
FIG. 27 is a front elevation view of FIG. 26.
Figure 28:
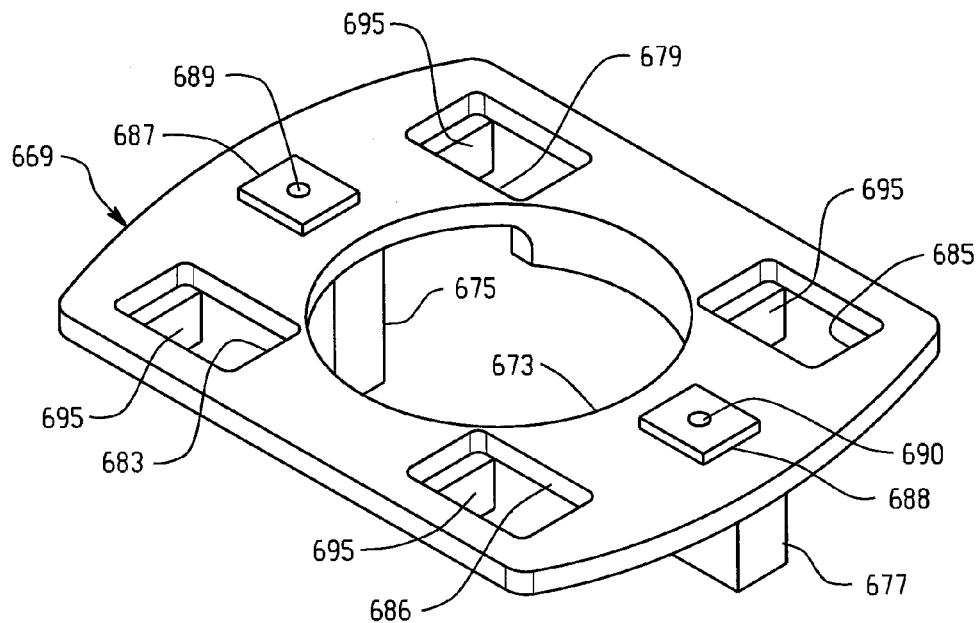
FIG. 28 is a perspective view of the swash plate of FIG. 26.
Figure 29:
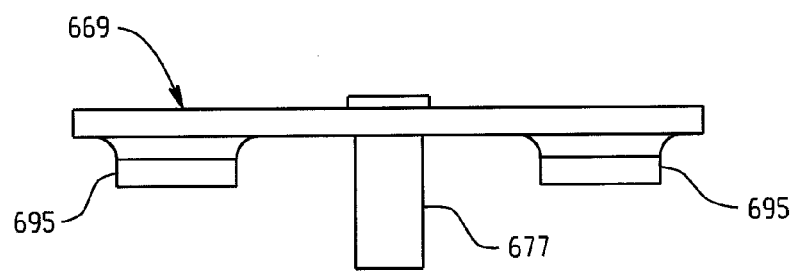
FIG. 29 is an end view of the swash plate of FIG. 26.

The plates 669, 671 each have four rectangular apertures denoted 679, 683, 685, 686 with respect to swash plate 669 in FIG. 26. It will be understood that similar lugs on plate 671 (not shown) are slidably received in corresponding slots in the spur gear 658 with appropriate wear plates corresponding to wear plates 656, 657 for spur gear 646.

Each of the swash plates 669, 671 has a seal plate denoted by reference numerals 687, 688 for swash plate 669, each of which has an aperture therein which communicates with a collector recess such as 639, 641 (see FIG. 22) formed on an inner face of the casing 608 for providing lubricant to the lugs of the plate 671. The seal plates 687, 690 for plate 669 each have a lubricant orifice therein denoted by 689, 690 which, it will be understood, communicate with corresponding collector recess (not shown) formed on the inner face of casing 606. A seal (not shown) is disposed between recesses and pads 687, 688.

Referring to FIG. 20, lubricant passages 691, 692 are formed in the lugs 675, 677 respectively for communicating with the apertures 689, 690 respectively. Each of the lubricant passages 691, 692 in lugs 675, 677 respectively has a cross port denoted 693, 694 respectively communicating therewith for providing lubricant to the surface of the lug for sliding contact with the wear pads such as pads 656. The swash plate lug passages 691, 692 and cross passages 693, 694 typically communicate with supply passages respectively 605, 607 provided in casing 606, which passages 605, 607 are connected to annular lubricant gallery such as 613 formed in the casing which communicates with a supply passage such as 617, 619. It will be understood that the lugs 665, 667 on the swash plate 671 have similar lubricant passage arrangements as shown in FIG. 20.

Referring to FIGS. 26-29, each of the apertures 679, 685, 686, 683 has support flanges formed on two opposite sides thereof which flanges extend downwardly toward the lugs 675, 677 as denoted typically by reference numeral 695; and, these flanges provide support for wear pads as will hereinafter be described.

Referring to FIG. 21, each of the swash apertures 679, 685, 686, 683 of swash plate 669 has one of the support bars 642 extending therethrough in sliding engagement in a direction at right angles to the sliding engagement of the lugs 675, 677. The bars 642 are in sliding contact with wear pads typically denoted 696 and which are retained by blocks 697. Each of the wear pads 696 has a spherical surface provided on the pad in contact with a corresponding concave spherical surface formed in the respective block 697 therewith similar to the arrangement illustrated for pads 666, 668 in FIG. 24. Lubricant passages noted 698, 699 are provided in the bars 642 which are in communication with supply ports such as ports provided in the recesses 639-641 of casing 608 as shown in FIG. 21. Thus, the swash plates 669, 671 slide in one direction on the bars 642; and, the spur gears 646, 658 slide with respect to the swash plate lugs in a direction at right angles to the movement of the swash plates on the bars 642. The bars 642, thus provide three functions, firstly to secure the half shells of the casings together, secondly to provide sliding registration for the swash plates and thirdly to provide a supply of lubricant to the wear pads for the sliding contact with the swash plates.

In the present practice it has been found satisfactory to form the wear pads for the swash plate support bars and lugs of bronze material; and, optionally, if desired, the surface of the wear pads may be coated with a material filled with polytetrafluoroethylene (PTFE) for enhanced anti-friction properties.

The speed/torque enhancing power transmission of the present disclosure may be operated as a speed increaser by inputting power to the ring gear 602 and providing power output through both of the half shafts 624, 632. Alternatively, the power transmission may be operated as a torque enhancing transmission by inputting power to both half shafts 624, 632 and providing enhanced torque output at reduced speed to the ring gear. In either of the afore said arrangements, the transmission of the present disclosure provides a relatively high numerical ratio of speed between the input and output by utilizing twin orbital spur gears engaging a common ring gear with the spur gears orbiting in diametrally opposed, or 180° out-of-phase, arrangement to provide inherent dynamic balancing of the orbital movement. The arrangement of the power transmission 600 thus enables substantial power transmission in a minimum of volume thereby permitting utilization of the transmission installation which otherwise would require a prohibitively large power transmission unit.

Figure 18:
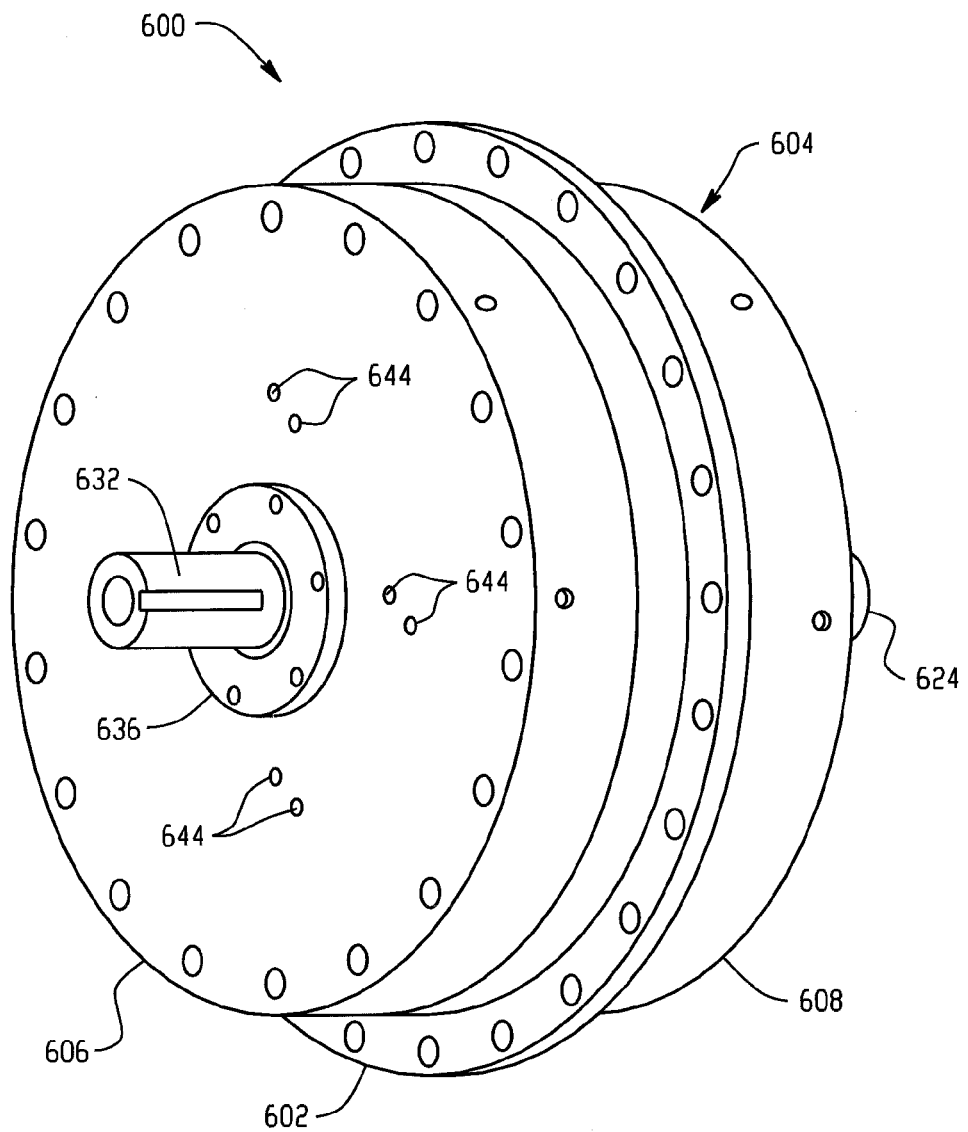
FIG. 18 is a perspective view of another version of the speed increaser of the present disclosure from power inputted to the ring gear and power outputted to opposite ends of the shafting.
Figure 19:
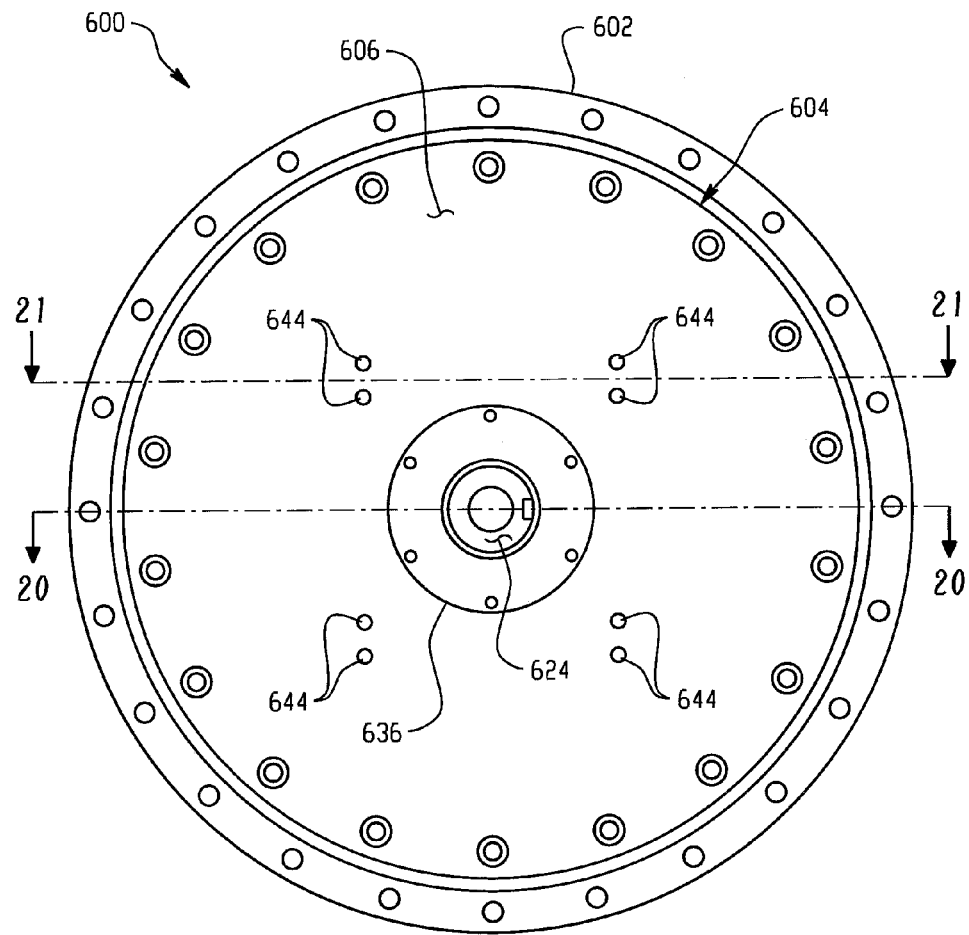
FIG. 19 is a front view of the speed increaser of FIG. 18.
Figure 30:
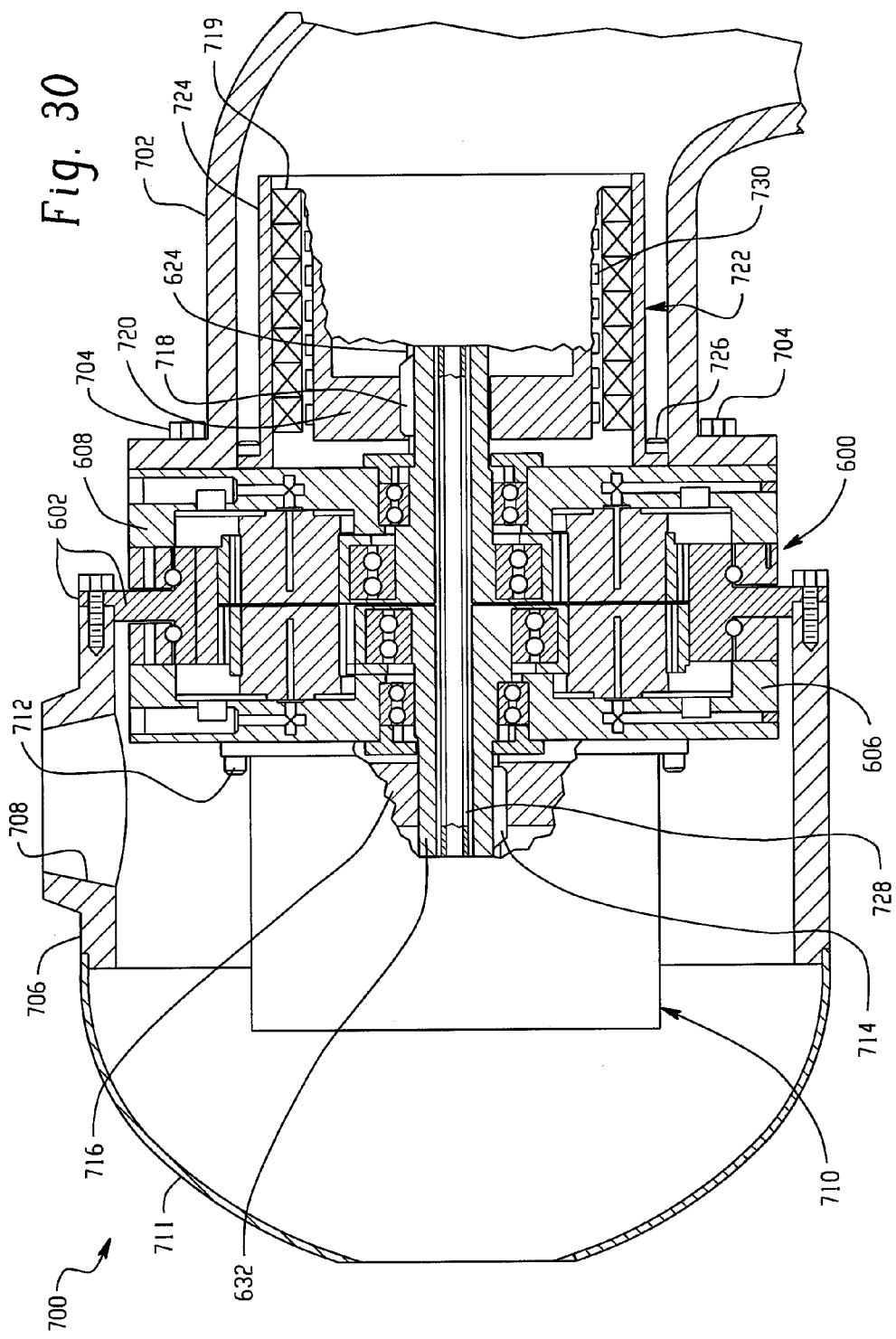
FIG. 30 is a cross-sectional view of another version of the speed increaser of the present disclosure installed in the propeller hub of a wind turbine for driving dual power generators.

Referring to FIG. 30, another version of the speed increaser of the present disclosure is illustrated generally at 700 and has the speed increaser 600 of FIG. 18 attached to a support housing 702 by fasteners such as bolts 704 threadedly engaging the casing 608 of the housing 604. Support housing 702 may be rotatably mounted to a stanchion or tower (not shown) for supporting a wind turbine. The annular power input member or ring gear 602 has its outer periphery attached to the hub 706 of a wind turbine impeller, the hub having bosses with apertures such as aperture 708 provided circumferentially spaced thereabout for receiving impeller blades (not shown). The hub may have a spinner or hub cover 711 for providing streamlining thereof. The power output shaft 632 of speed increaser 600 has a first power generator indicated generally at 710 secured to the casing shell 606 of the speed increaser such as by a plurality of circumferentially spaced bolts 712.

The power output shaft 632 drivingly engages, such as for example by means of a key 714, the rotor 716 of the power generator 710.

The oppositely disposed output shaft 624 of the speed increaser 600 has engaged therewith in driving engagement by a suitable drive coupling such as, for example, key 718 the rotor 720 of a second generator indicated generally at 722 which has its stator 724 attached to the casing 608 by suitable means such as bolts 726 spaced circumferentially thereabout. The stator 724 has stator coil 728; and, the rotor is typically provided with magnetic members 730. The embodiment 700 of FIG. 26 thus enables the disposition of dual generators within the impeller hub and housing of a wind turbine for reduced volume and mass yet providing the required speed increase from the impeller necessary to drive the generators and provide double the power output.

In the dual generator wind turbine arrangement 700 of FIG. 26, the output shafts 632, 624 are hollow and permit a stationary tube 728 to be disposed therethrough so as to permit the electrical leads (not shown) from generator 710 to pass through the speed increaser 600 and the generator 722 for external connection through an unshown port provided in housing 702.

Figure 31:
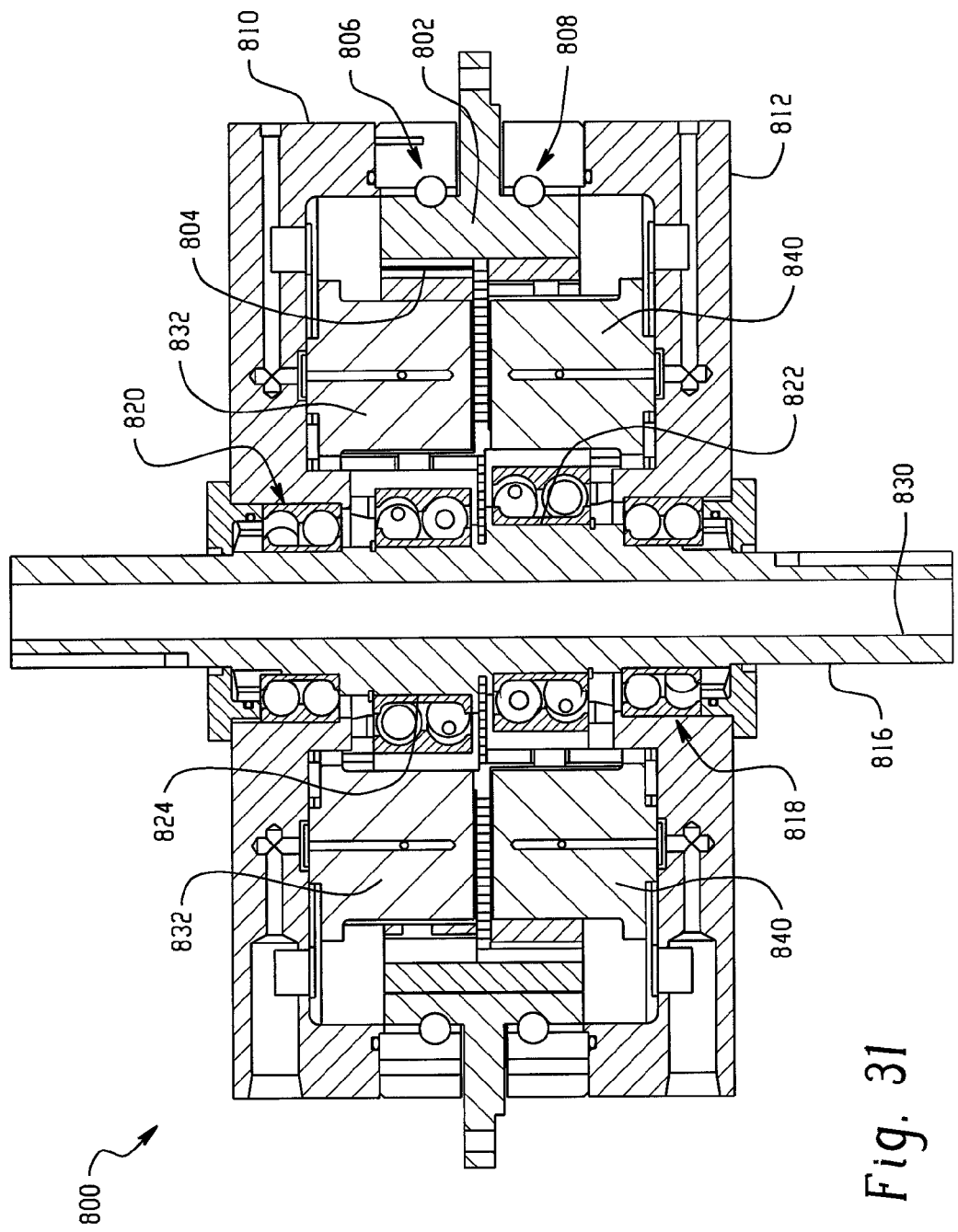
FIG. 31 is a section view of another version of the transmission of the present disclosure employed as a speed increaser for a driving dual power generator from opposite ends of a one piece shaft.
Figure 32:
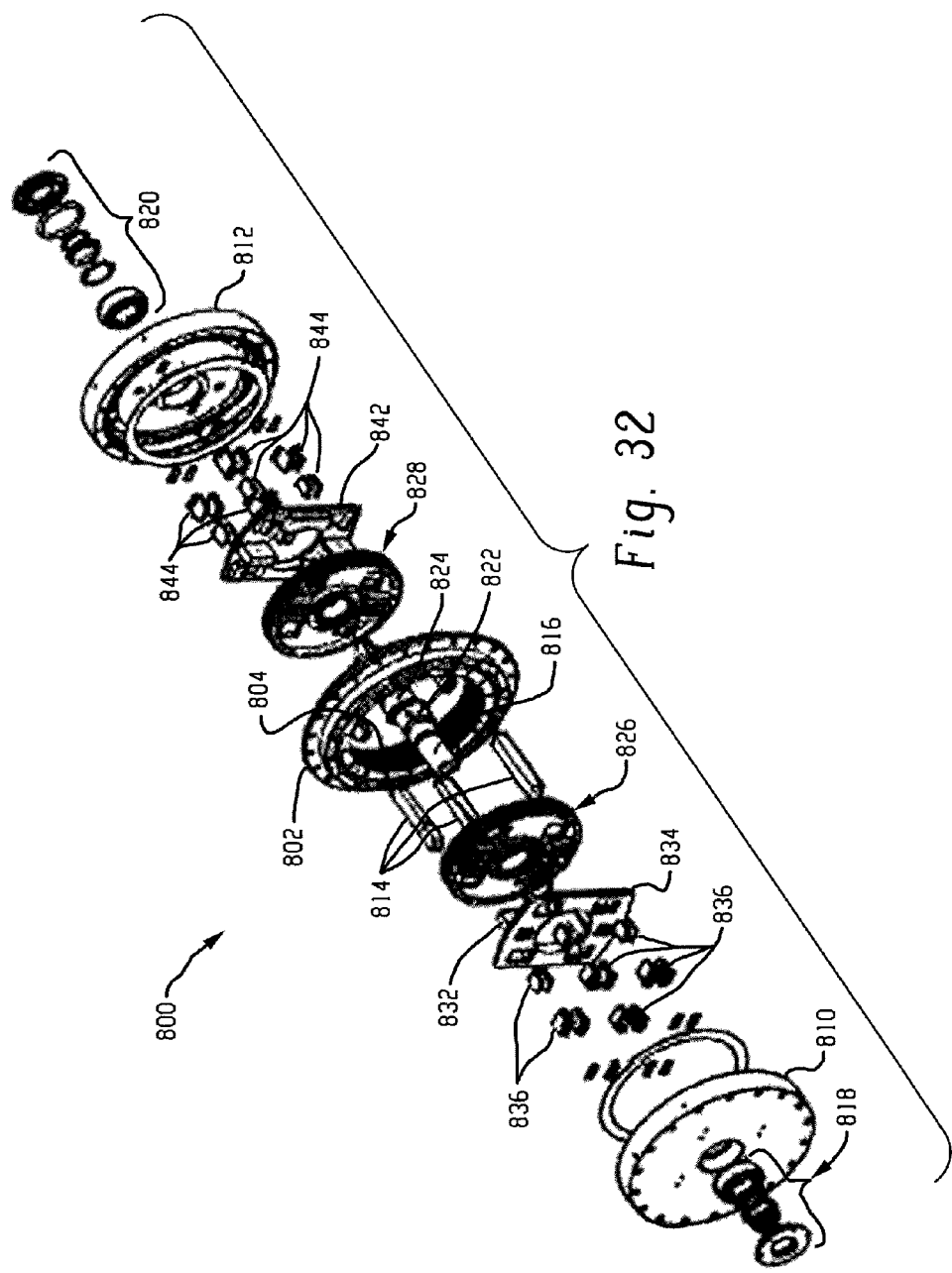
FIG. 32 is an exploded view of the transmission of FIG. 31.

Referring to FIGS. 31 and 32, another version of the speed/torque enhancing power transmission of the present disclosure is illustrated wherein a common ring gear 802 with internal teeth 804 is journalled for rotation via bearings indicated generally at 806, 808 on housing structure comprising casings 810, 812 which are secured together by four internal bars denoted typically at 814, three of which are illustrated in FIG. 32.

A one-piece shaft 816 is journalled in casing 812 at one end by bearing assembly indicated generally at 818 and the shaft is journalled at its opposite end in casing 810 by a bearing assembly indicated generally at 820. It will be understood that bars 814 are secured at their opposite ends respectively to casings 810, 812. The output shaft 816 has a first and second axially adjacent eccentric surface 822, 824 which are offset diametrally opposite or in other words, 180° out-of-phase on the shaft. The eccentric surface 822 has rotatably mounted thereon a spur gear 826; and, eccentric surface 824 has rotatably mounted thereon a second spur gear indicated generally at 828. Spur gears 826, 828 are constrained as will hereinafter be described for non-rotatable orbital movement with the teeth of each in engagement with the teeth 804 of ring gear 802 to provide speed increase. Upon power input to and rotation of the ring gear 802 it causes orbital movement of the spur gears 826, 828 about the eccentrics 822, 824 and an increased speed of rotation of the shaft 816. The shaft 816 may have a hollow interior 830 as shown in FIG. 31 if desired for passage of electrical leads therethrough.

The spur gear 826 has diametrally opposed slots formed therein into which are received lugs such as lug 832 on a first swash plate 834 which permits the spur gear 826 to move along a vertical axis with respect to the swash plate. The swash plate is slidably received on rods 814 passing through the apertures in the spur gear 826 and swash plate 834 to permit sliding movement of the swash plate 834 on rods 814 and preventing rotation about the shaft axis of either the swash plate or the spur gear. Sets of wear pads denoted typically at 836 are provided for contact between the swash plate and the bars 814. Similarly, wear pads (not shown) are provided for sliding movement of the spur gear on lugs such as 832.

The second spur gear 828 is similarly disposed for sliding movement on a pair of lugs 840 provided on the second swash plate 842 which has apertures through which the rods 814 pass for enabling sliding movement of the swash plate on the bars 814 and casing 812 in a horizontal direction or direction at right angles to the sliding movement of spur gear 828 on the lugs 840. The spur gear 828 is thus constrained from rotation yet permitted to orbit in contact with the teeth 804 of ring gear 802 and rotatably on eccentric 824. Wear pads denoted typically by reference numeral 844 are provided on each swash plate 842 to prevent rotation of the swash plate and spur gear but permits sliding movement of the swash plate on the bars 814. The embodiment 800 of FIGS. 31 and 32 operates in the same manner as the embodiment 600; whereas, the embodiment 800 employs a one-piece shaft.

The speed/torque enhancing power transmission of the present disclosure thus provides for substantially relatively high power transmission and does so in a significantly reduced volume for the gear box and enables either power input through a ring gear and power output through the ends of shafting which may either be a one-piece or separate half shafts for applications requiring a speed increase at the output. Alternatively, if power is inputted through the opposite ends of the shafting, a high degree of torque multiplication application can be outputted on the ring gear. The significant difference between the speed of rotation of the ring gear and the shafting is accomplished by a pair of diametrally opposed or 180° out-of-phase orbiting spur gears engaging the ring gear whereby the spur gears are rotatably mounted on individual eccentrics provided on the shafting. The speed/torque enhancing power transmission of the present disclosure is described as installed in the power hub of a wind turbine for driving a separate power generator on each of the opposite ends of the shaft thereby providing twice the power output without increasing the size of the power transmission. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A speed/torque enhancing power transmission comprising:
   a) a housing structure;
   b) a ring gear member journalled on the housing structure for rotation about an axis and adapted for external connection thereto for power transmission;
   c) a shafting structure journalled on the housing for rotation about said axis, said shafting extending axially in opposite directions from the ring gear member along said axis and having a first eccentric surface thereon and a second eccentric surface diametrally opposed to and axially adjacent said first eccentric surface;
   d) a first spur gear member disposed for rotatably contacting said first eccentric surface, and disposed on said housing structure for non-rotatable orbital movement about said axis for orbitally engaging the ring gear;
   e) a second spur gear member disposed for rotatably contacting said second eccentric surface and disposed on said housing structure for non-rotatable orbital movement about said axis for orbitally engaging the ring gear; and,
   f) wherein upon power input to one of the ring gear and the shafting, the speed of the other is respectively increased and decreased; and, further comprising:
   g) a first plate member with a first set of surfaces disposed on opposite sides of said axis and contacting said first spur gear for sliding movement in a first direction normal to said axis of rotation, with a second set of surfaces on opposite sides of said axis contacting said first spur gear for sliding movement in a second direction normal to said axis of rotation and orthogonal to said first direction; and h) a second annular plate member with a first set of surfaces disposed on opposite sides of said axis and contacting said second spur gear for sliding movement in a first direction normal to said axis, with a second set of surfaces on opposite sides of said axis contacting said second spur gear for sliding movement in a second direction normal to said axis and orthogonal to said first direction.

2. The transmission of claim 1, wherein said shafting structure includes a first half shaft with said first eccentric surface thereon and a second half shaft with said second eccentric surface thereon.

3. The power transmission of claim 1, wherein said first and second spur gears are each disposed on said housing structure for sliding movement along a first and second orthogonal axis which axes are normal to said axis of rotation.

4. The power transmission of claim 1, wherein said first and second sets of surfaces includes removable wear pads.

5. The power transmission of claim 4, wherein said wear pads include substantially spherically radiused surfaces contacting said plate.

6. The power transmission of claim 5, wherein said spherically radiused surface includes an annular seal.

7. The power transmission of claim 6, further comprising a supply port for supplying lubricant to the spherically radiused surface.

8. The power transmission of claim 1, wherein said housing structure includes a plurality of elongated axially extending guide members disposed in circumferentially spaced arrangement about the axis of rotation, said members extending through said first and second spur gears in sliding contact therewith, said guide members having opposite ends thereof secured to said housing structure on axially opposite sides of said ring gear.

9. The power transmission of claim 8, wherein said first and second spur gear each includes a set of removable wear pads for contacting one of said guide members.

10. The power transmission of claim 9, wherein said wear pads includes a spherical surface.

11. The power transmission of claim 8, wherein each of said guide members includes a lubricant passage for supplying lubricant for said sliding contact.

12. The power transmission of claim 1, wherein said shafting includes a one piece shaft member extending through said ring gear.

13. The power transmission of claim 1, wherein the speed ratio of output to input is in the range of about 38-50:1.

14. The power transmission of claim 1, wherein the speed ratio of output to input is about 38:1 for a 125 kilowatt power output.

15. The power transmission of claim 1, wherein the speed ratio of output to input is about 50:1 for a 250 kilowatt power output.

16. The power transmission of claim 1, wherein the speed ratio of output to input is in the range of about 38-50:1 upon power input to said ring gear.

17. The power transmission of claim 1, wherein the speed ratio of output to input for power input to the ring gear is about 38:1 for 125 kilowatt output and about 50:1 for 250 kilowatt output.

18. The speed enhancer of claim 1, wherein upon power input to the shafting structure the speed ratio of input to output is in the range of about 38-50:1.

19. A speed/torque enhancing power transmission comprising:

a) a housing structure;

b) a ring gear member journalled on the housing structure for rotation about an axis and adapted for external connection thereto for power transmission;

c) a shafting structure journalled on the housing for rotation about said axis, said shafting extending axially in opposite directions from the ring gear member along said axis and having a first eccentric surface thereon and a second eccentric surface diametrally opposed to and axially adjacent said first eccentric surface;

d) a first spur gear member disposed for rotatably contacting said first eccentric surface, and disposed on said housing structure for non-rotatable orbital movement about said axis for orbitally engaging the ring gear;

e) a second spur gear member disposed for rotatably contacting said second eccentric surface and disposed on said housing structure for non-rotatable orbital movement about said axis for orbitally engaging the ring gear; and, f) wherein upon power input to one of the ring gear and the shafting, the speed of the other is respectively increased and decreased, wherein said housing structure includes a first and second set of diametrally opposed surfaces disposed for sliding contact with each of said first and second spur gear, said sliding surfaces include lubricant galleries for supplying pressurized lubricant thereto.

* * * * *